United States Patent
Furuse

(10) Patent No.: US 7,805,259 B2
(45) Date of Patent: Sep. 28, 2010

(54) METHOD FOR DETECTING AN OPERATION MALFUNCTION OF A LEAKAGE INSPECTOR, AND A LEAKAGE INSPECTOR HAVING A FUNCTION TO DETECT AN OPERATION MALFUNCTION THEREOF

(75) Inventor: Akio Furuse, Tokyo (JP)

(73) Assignee: Cosmo Instruments Co., Ltd., Tokyo (JP)

( * ) Notice: Subject to any disclaimer, the term of this patent is extended or adjusted under 35 U.S.C. 154(b) by 98 days.

(21) Appl. No.: 12/087,765

(22) PCT Filed: Jan. 12, 2007

(86) PCT No.: PCT/JP2007/050333

§ 371 (c)(1), (2), (4) Date: Jul. 14, 2008

(87) PCT Pub. No.: WO2007/080972

PCT Pub. Date: Jul. 19, 2007

(65) Prior Publication Data

US 2009/0012726 A1    Jan. 8, 2009

(30) Foreign Application Priority Data

Jan. 13, 2006  (JP) ............................. 2006-006559
Aug. 23, 2006  (JP) ............................. 2006-226278

(51) Int. Cl.
*G01B 5/28*    (2006.01)
*G01M 19/00*   (2006.01)

(52) U.S. Cl. ........................... 702/35; 702/51; 702/141; 73/40

(58) Field of Classification Search .................. 702/51, 702/114, 52
See application file for complete search history.

(56) References Cited

U.S. PATENT DOCUMENTS

| 4,441,357 | A  | * | 4/1984  | Kahn et al. ................... 73/40   |
| 4,715,214 | A  | * | 12/1987 | Tveter et al. ................ 73/49.2  |
| 4,947,352 | A  | * | 8/1990  | Jenkins ....................... 702/51  |
| 6,182,501 | B1 | * | 2/2001  | Furuse et al. ............... 73/49.2   |
| 6,374,663 | B1 | * | 4/2002  | Muller et al. ............... 73/49.2   |
| 2007/0233412 | A1 | * | 10/2007 | Gotoh et al. ............... 702/100 |

FOREIGN PATENT DOCUMENTS

JP    63-045526    2/1988

(Continued)

OTHER PUBLICATIONS

Extended European Search Report issued May 7, 2010 for corresponding European patent application No. 07 706 675.1.

*Primary Examiner*—Jonathan Teixeira Moffat
(74) *Attorney, Agent, or Firm*—David N. Lathrop

(57) ABSTRACT

A method for detecting an operation malfunction of a leakage inspector causes the leakage inspector to execute a calibration process and an inspection process. The calibration process seals air inside a first device serving as a reference device and measures changes in pressure over two time intervals. The inspection process seals air inside a second device to be checked for a leak and measures changes in pressure over two time intervals. A ratio is calculated from these measured changes in pressure and the ratio is used to determine whether an operation malfunction occurs in the leakage inspector.

16 Claims, 13 Drawing Sheets

FOREIGN PATENT DOCUMENTS

| | | |
|---|---|---|
| JP | 04-221733 | 8/1992 |
| JP | 08-043243 | 2/1996 |
| JP | 10062148 A * | 3/1998 |
| JP | 2005-077310 | 3/2005 |
| JP | 2005-106539 | 4/2005 |
| WO | WO 82/01590 | 5/1982 |

* cited by examiner

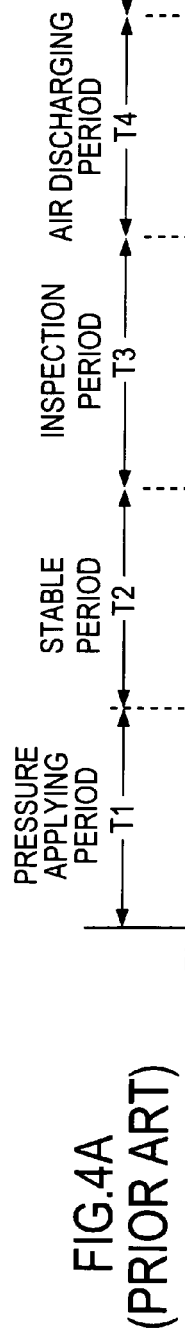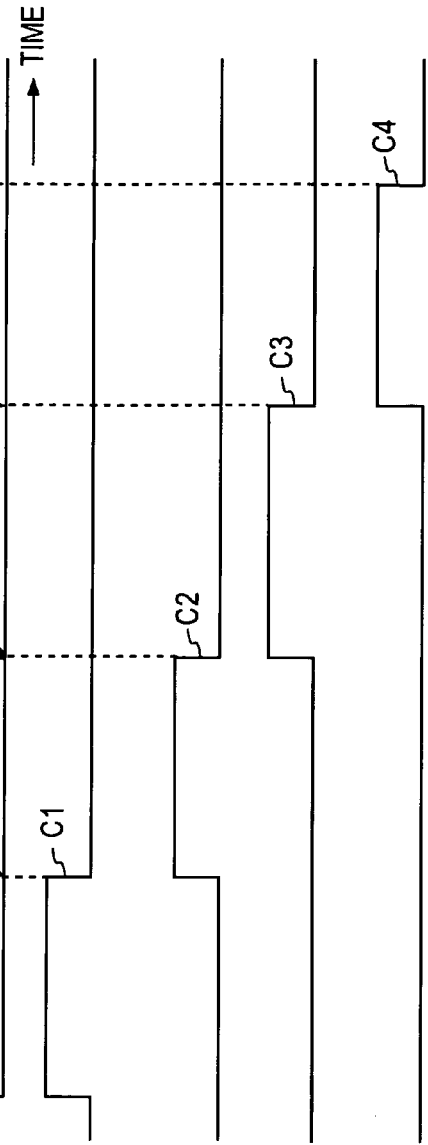

METHOD FOR DETECTING AN OPERATION MALFUNCTION OF A LEAKAGE INSPECTOR, AND A LEAKAGE INSPECTOR HAVING A FUNCTION TO DETECT AN OPERATION MALFUNCTION THEREOF

TECHNICAL FIELD

The present invention relates to a method for detecting a fault in a leakage inspector that checks whether or not a device has a leak, and to a leakage inspector implementing the method.

BACKGROUND ART

Leakage inspectors that use air pressure to check whether containers or mechanical parts have a leak, such as gas meters, fuel tanks of cars, and engine housings, have been practically used (see Patent Literature 1, for example). The leakage inspectors that have been used conventionally can be divided into two types. In one type (hereinafter called pressure-difference leakage inspectors), air pressure is applied at the same time to the inside of a device under inspection, such as the container or mechanical part described above, and to the inside of a reference tank which has no leak, and it is determined whether or not the device has a leak according to whether a pressure difference occurs between the insides of the two units described above. In the other type (hereinafter called gauge-pressure leakage inspectors), air pressure is applied only to the inside of a device under inspection, and it is determined whether or not the device has a leak according to whether the applied air pressure changes within a predetermined period of time.

[Conventional Pressure-difference Leakage Inspectors]

FIG. 1 is a diagram showing the structure of a leakage inspector 100 that is a conventional pressure-difference leakage inspector.

The pressure-difference leakage inspector 100 comprises a pneumatic apparatus 200 and a decision apparatus 300.

The pneumatic apparatus 200, shown in FIG. 1, includes a pneumatic source 201 for applying pressure to the inside of a device under inspection, such as a compressor; a pressure control valve 202 for controlling the amount of air output from the pneumatic source 201 to control the air pressure which the pneumatic source 201 externally applies to a predetermined air pressure; a three-way solenoid valve 203 capable of switching between a state (XY-port connection state) in which the air pressure controlled by the pressure control valve 202 is applied to devices A and B and to a reference tank 207 and a state (YZ-port connection state) in which air in the devices A and B and the reference tank 207 is discharged to the atmosphere; sealing valves 204A and 204B for sealing the inside air in a state in which the air pressure is applied to the inside of the device A or B and to the inside of the reference tank 207; a differential pressure gauge 205 for measuring a pressure difference between the inside of the device A or B and the inside of the reference tank 207; switching valves 206A and 206B for switching between the devices A and B to which the air pressure is applied to allow one of the devices to be inspected while the other is replaced; the reference tank 207; and connection jigs 208A and 208B for connecting air supply lines to the devices A and B. One end of the air supply lines is connected to the outlet of the pneumatic source 201, the air supply lines supply air to the devices A and B and to the reference tank 207. As shown in FIG. 1, the pressure control valve 202, the three-way solenoid valve 203, the sealing valves 204A and 204B, and the switching valves 206A and 206B are disposed in the air supply lines.

The decision apparatus 300 includes a variable-gain amplifier 301 (with the gain being switched between a low gain and a high gain) for amplifying the output signal of the differential pressure gauge; an A/D converter 302; a microcomputer including an input port 303, a CPU (central processing unit) 304, a ROM (read-only memory) 305, a RAM (random access memory) 306, which is a memory to and from which data can be written and read, and an output port 307; and a leak decision display unit 308 for showing a leak decision result, such as a display unit.

In the current case, the ROM 305 stores an operation-timing generation program, a control-information generation program, a measured-value storage program, and a leak decision program that make the microcomputer operate as operation-timing generation means, control-information generation means, measured-value storage means, and leak decision means, respectively. These programs are read from the ROM 305 and stored in the RAM 306 as an operation-timing generation program 306A, a control-information generation program 306AB, a measured-value storage program 306B, and a leak decision program 306C when the microcomputer is started. In the drawings, programs are abbreviated as "PGs". The programs stored in the RAM 306 are read by the CPU 304, and the CPU 304 decodes and executes them to function as the above-described means.

FIG. 2A to FIG. 2E are graphs for describing a general operation of the leakage inspector 100. FIG. 2A is a graph showing temporal changes of the output of the variable-gain amplifier 301. In FIG. 2A, the vertical axis indicates the output of the variable-gain amplifier 301 and the horizontal axis indicates time. FIG. 2B is a graph showing a timing signal C1 that is H (high) during a pressure applying period T1 and is L (low) in the other periods. FIG. 2C is a graph showing a timing signal C2 that is H during a stable period T2 and is L in the other periods. FIG. 2D is a graph showing a timing signal C3 that is H during an inspection period T3 and is L in the other periods. FIG. 2E is a graph showing a timing signal C4 that is H during an air discharging period T4 and is L in the other periods. In each of FIG. 2B to FIG. 2E, the vertical axis indicates the voltage of a corresponding control signal and the horizontal axis indicates time.

The pneumatic apparatus 200 operates differently in four transition periods of the pressure applying period T1, the stable period T2, the inspection period T3, and the air discharging period T4.

In the pressure applying period T1, the port X and the port Y are connected in the three-way solenoid valve 203, and the sealing valves 204A and 204B are made to open. With these actions, air pressure caused by the operation of the pneumatic source 201 is applied to the inside of either the device A or B and to the inside of the reference tank 207.

In the stable period T2, the sealing valves 204A and 204B are closed. With these actions, the inside of either the device A or B and the inside of the reference tank 207 are sealed with the air pressure being applied. This state is held for a predetermined period to make the inside air pressure stable (to remove the influence of adiabatic changes in the air pressure). In the stable period T2, the gain of the variable-gain amplifier 301 is switched to the low gain. The decision apparatus 300 determines that the device A or B has "no large leak" if the output $V_M$ (in FIG. 2A) of the variable-gain amplifier 301 does not reach a setting (NG) in this state. The decision result is shown in the leak decision display unit 308. When the stable period T2 is finished, the output of the variable-gain amplifier 301 is reset to zero, and the gain of the variable-gain amplifier 301 is switched to the high gain. Then, the period proceeds to the inspection period T3.

In the inspection period T3, the pressure difference output from the differential pressure gauge 205 is amplified by the variable-gain amplifier 301, which is set to have the high gain. Whether a leak exists is determined by whether the amplified value output from the variable-gain amplifier 301 exceeds the setting (NG). The decision result is shown on the leak decision display unit 308. In the stable period T2, the air pressure inside either the device A or B and the air pressure inside the reference tank 207 are stable. In the inspection period T3, the pressure difference amplified by the variable-gain amplifier 301, set to have the high gain, is checked to detect even a small change in the pressure difference.

In the air discharging period T4, the sealing valves 204A and 204B are made to open, and the port Y and the port Z of the three-way solenoid valve 203 are connected. With these actions, the air sealed inside either the device A or B and the air sealed inside the reference tank 207 are discharged to the atmosphere through the port Z, and the inside air pressure becomes equal to the atmospheric pressure, thus completing the inspection.

Switching to each of these periods is conducted, for example, as described below. First, the operation-timing generation means generates one of the timing signals C1, C2, C3, and C4 (FIG. 2B to FIG. 2E) corresponding to the current period. The control-information generation means generates control signals that make the three-way solenoid valve 203, the sealing valves 204A and 204B, and the variable-gain amplifier 301 execute the actions corresponding to the period indicated by the signal, that is, one of the timing signals C1, C2, C3, and C4, generated by the operation-timing generation means. The generated control signals are output from the output port 307 to the three-way solenoid valve 203, the sealing valves 204A and 204B, and the variable-gain amplifier 301. The three-way solenoid valve 203, the sealing valves 204A and 204B, and the variable-gain amplifier 301 perform the actions according to the control signals in each period.

The reference tank 207 of the pressure-difference leakage inspector 100 should have better air temperature stability than the device A or B. When a test pressure TP is applied to the inside of a device under inspection and to the inside of the reference tank 207, even if the temperature of the supplied air is room temperature, the temperature inside the device and the temperature inside the reference tank 207 increase (adiabatic characteristics). These temperature increases depend on the test pressure TP and the supplied-air temperature.

Since the internal pressure of the device under inspection equals the internal pressure of the reference tank 207 at the end of the pressure applying period T1, the pressure difference is almost zero. Because the reference tank 207 has better air temperature stability than the device under inspection, however, the air temperature becomes stable in the reference tank 207 more quickly than in the device under inspection after the sealing valves 204A and 204B are closed. As a result, a change in air temperature in the device under inspection appears as a change in pressure difference. When the device under inspection and the reference tank 207 have no leak, the pressure difference attenuates as time passes and reaches a certain pressure difference after a while. This is the reason why, when the sealing valves 204A and 204B are closed, the device under inspection and the reference tank 207 have a pressure difference even though they have no leak.

[Conventional Gauge-pressure Leakage Inspectors]

FIG. 3 is a diagram showing the structure of a leakage inspector 110 that is a conventional gauge-pressure leakage inspector. In FIG. 3, the same symbols as those used in FIG. 1 are assigned to the same portions as those shown in FIG. 1.

The gauge-pressure leakage inspector 110 comprises a pneumatic apparatus 400 and a decision apparatus 300. Since the decision apparatus 300 is the same as that in the pressure-difference leakage inspector 100, only the structure of the pneumatic apparatus 400 will be described here.

The pneumatic apparatus 400 includes a pneumatic source 201, a pressure control valve 202, a three-way solenoid valve 203, a sealing valve 204, switching valves 206A and 206B, connection jigs 208A and 208B, and a pressure gauge 209 for measuring the pressure inside device A or B.

FIG. 4A is a graph showing changes in the pressure measurement value output from the pressure gauge 209. In FIG. 4A, the vertical axis indicates the output of the pressure gauge 209 and the horizontal axis indicates time.

In the leakage inspector 110, a test pressure TP is applied to the inside of the device A or B in a pressure applying period T1. The sealing valve 204 is closed at the end of the pressure applying period T1. After the sealing valve 204 is closed, the air pressure inside the device A or B is gradually reduced due to an adiabatic change (the heat of the air inside the device, where the temperature was increased by applying the pressure, is gradually discharged to the device and the air temperature decreases to change the air pressure).

FIG. 4B is a graph showing the output waveform of a variable-gain amplifier in the decision apparatus 300.

The output of the variable-gain amplifier is obtained by amplifying the difference between the test pressure TP, which is a bias value, and the pressure shown in FIG. 4A. In a stable period T2, the variable-gain amplifier operates with its gain set to a low gain, as in the pressure-difference leakage inspector 100. When the output of the variable-gain amplifier reaches a setting (NG), the decision apparatus 300 determines that the device A or B has "a large leak". If the output of the variable-gain amplifier does not reach the setting NG during the stable period T2, the output of the variable-gain amplifier is reset and the gain of the variable-gain amplifier is switched to a high gain. Then, the period proceeds to an inspection period T3.

In the inspection period T3, the variable-gain amplifier of the decision apparatus 300 operates with the high gain. When the output M of the variable-gain amplifier, corresponding to a reduction in pressure, does not exceed the setting (NG) during the inspection period T3, the decision apparatus 300 determines that the device under inspection has "no leak", thus completing the inspection. The same method as that in the pressure-difference leakage inspector is used to control each period (as shown in FIG. 4C to FIG. 4F).

[Malfunction of Leakage Inspector]

The operations of the leakage inspectors described above apply when each part of the leakage inspectors operates normally. A malfunction may occur in some cases. In those cases, while the malfunction is not detected, the inspection may be continued to determine that all devices under inspection have "no leak" or that all devices under inspection have "a leak", irrespective of whether the devices under inspection actually have a leak or not.

Example malfunctions in the parts will be described below.

(1) It is assumed that the pressure-difference leakage inspector 100 (FIG. 1) performs leak inspection while the port X and the port Y are not connected in the three-way solenoid valve 203 or while both the sealing valves 204A and 204B are closed. In that case, air pressure is not applied to the inside of the device A or B or the inside of the reference tank 207. Therefore, the pressure difference between both the insides is zero, and the value measured by the differential pressure gauge 205 is also zero. As a result, the leak decision means may incorrectly determine that the device under inspection has "no leak".

(2) It is assumed that the pressure-difference leakage inspector 100 (FIG. 1) performs leak inspection while both the switching valves 206A and 206B are closed, whereas the three-way solenoid valve 203 and the sealing valves 204A and 204B operate normally. In that case, since there is usually no leak in the air supply lines, the value measured by the differential pressure gauge 205 is sufficiently small. As a result, the leak decision means may incorrectly determine that the device under inspection has "no leak".

The same malfunction also occurs in the gauge-pressure leakage inspector 110 (FIG. 3).

(3) It is assumed that the pressure-difference leakage inspector 100 performs leak inspection while the differential pressure gauge 205 is inoperable. In that case, since the differential pressure gauge 205 outputs a value of zero, the leak decision means may incorrectly determine that the device under inspection has "no leak", irrespective of the conditions of the devices A and B.

If one of the above types of malfunctions occurs in the gauge-pressure leakage inspector 110, the value measured by the pressure gauge 209 is zero. In that case, the leak decision means may incorrectly determine that the device under inspection has "no leak", irrespective of the conditions of the devices A and B.

To solve the drawbacks of the leakage inspectors described above, the applicant proposed a pressure-difference leak tester having a self-diagnosis function (see Patent Literature 2).

The pressure-difference leak tester having a self-diagnosis function, proposed before, determines before the start of an inspection that the leak tester operates normally when control is performed such that the port X and the port Y of the three-way solenoid valve 203 are connected while one of the sealing valves 204A and 204B is closed, and the value obtained by amplifying the detected pressure difference in the variable-gain amplifier with the low gain exceeds the NG level. In other words, when control is performed such that the port X and the port Y of the three-way solenoid valve 203 are connected while one of the sealing valves 204A and 204B is closed, if the three-way solenoid valve 203 operates normally, pressure is applied only to the device under inspection or to the reference tank 207. When the differential pressure gauge 205 operates normally and the decision apparatus 300 also operates normally in that state, a decision result should be output showing that the leak tester operates normally because the absolute value of the pressure difference becomes equal to or larger than the NG level even with the low-gain amplification sensitivity. Therefore, if a decision result indicating that the device under inspection has a leak is not output in that condition, it can be determined from the decision result that something malfunctions.

[Patent Literature 1] Japanese Registered Patent No. 1775588

[Patent Literature 2] Japanese Patent Publication No. H7-101193

DISCLOSURE OF THE INVENTION

Problems to be Solved by the Invention

In a method disclosed in Japanese Patent Publication No. H7-101193, self diagnosis is performed within a very short period of time at the start of inspection. This "very short period of time" is "about 0.5 seconds" according to the description in paragraph [0025] of Japanese Patent Publication No. H7-101193. When the number of devices under inspection ranges from several tens to several hundreds, the period required for self diagnosis has a small influence. As the number of devices under inspection increases, however, the influence of this period increases. Therefore, it is desirable that the period required for self diagnosis be as close to zero as possible.

The self diagnosis method disclosed in Japanese Patent Publication No. H7-101193 can be applied only to pressure-difference leakage inspectors and cannot be applied to gauge-pressure leakage inspectors.

A first object of the present invention is to provide a method for detecting a fault in a leakage inspector without using an extra period of time for self diagnosis and to provide a leakage inspector that performs the method.

A second object of the present invention is to provide a method for detecting a fault in a leakage inspector, the method being capable of executing a malfunction detection operation irrespective of whether the leakage inspector is of a pressure-difference type or of a gauge pressure type, and to provide a leakage inspector that performs the method.

Means to Solve the Problems

To solve the above-described problems, a first aspect of the present invention provides a method for detecting a fault in a leakage inspector that measures a change in air pressure inside a device in a state in which the air pressure inside the device is made higher than air pressure outside the device and checks whether or not the device has a leak according to the change in air pressure inside the device, the method comprising a calibration step and an inspection step, the calibration step comprising: a step of applying pressure to an inside of a first device serving as a reference device; a step of sealing air inside the first device; a step of measuring a pressure change B1 inside the first device, caused between an end point of the step of sealing the air inside the first device and a first point that is elapsed a predetermined period of time from the end point, and of storing the pressure change B1 in a storage section; and a step of measuring a pressure change B2 inside the first device, caused between the first point and a second point that is further elapsed the predetermined period of time from the first point, and of storing the pressure change B2 in the storage section; and the inspection step comprising: a step of applying pressure to an inside of a second device to be checked for a leak; a step of sealing air inside the second device; a step of measuring a pressure change B1' inside the second device, caused between an end point of the step of sealing the air inside the second device and a third point that is elapsed the predetermined period of time from the end point, and of storing the pressure change B1' in the storage section; a step of measuring a pressure change B2' inside the second device, caused between the third point and a fourth point that is further elapsed the predetermined period of time from the third point, and of storing the pressure change B2' in the storage section; a step of calculating a waveform ratio K as $(B1'-B2')/(B1-B2)$; and a step of deciding whether an operation malfunction occurs by using the value of the waveform ratio K. Here, "measuring" is defined to include both measuring a physical quantity and calculating a value from a measured physical quantity.

When the difference between the pressure changes measured in the calibration step, B1–B2, is sufficiently larger than zero and the difference between the pressure changes measured in the inspection step, B1'–B2', nearly equals zero, the waveform ratio K nearly equals zero. When the waveform ratio K nearly equals zero, it is estimated either that air pressure was not applied to the devices or that the measurement unit was inoperable, in the inspection step. Therefore, it is possible to detect an operation malfunction of a pneumatic apparatus of the leakage inspector.

After the calibration step, it is possible to apply only the inspection step to each of a plurality of second devices. In the inspection step of the present invention, self diagnosis is performed during the stable period, which is necessary in the leak inspection method. Therefore, extra time only for self diagnosis is not used in the present invention. In other words, even when self diagnosis for the leakage inspector and leak inspection are executed for all second devices, since extra time only for self diagnosis for the leak inspection is not used, the leak inspection is finished within the same period of time as the conventional period of time for inspection.

In addition, since self diagnosis for the inspectors performed by measuring the pressure changes in the device under inspection in this method, the self diagnosis can be applied not only to pressure-difference leakage inspectors but also to gauge-pressure leakage inspectors.

When the value of the waveform ratio K is much larger than 1, the difference between the pressure changes measured in the calibration step, B1–B2, and the difference between the pressure changes measured in the inspection step, B1'–B2', have the following relationship $$B1-B2 \ll B1'-B2'$$

((B1'–B2') is sufficiently larger than (B1–B2)). From this situation, it can be estimated that the first device, serving as a reference device, measured in the calibration step, and the second device, serving as an actual measurement target, measured in the inspection step, have different properties. Such estimation, indicating that the first device has a different property from the second device, is effective because the leakage inspector may erroneously detect a leak due to a different property among the devices. Erroneous-detection examples will be described below.

(4) It is assumed that the device under inspection is a cast, many blowholes are formed on the inner wall, a gateway to each blowhole is narrow, and the blowhole has a relatively large volume at a certain depth although there is no hole passing through from the inner wall to the outer wall. When the conventional pressure-difference leakage inspector 100 (FIG. 1) is used to check such a device for a leak, since air gradually enters the blowholes from the stable period T2 to the inspection period T3, the pressure difference measured by the differential pressure gauge 205 gradually increases as time passes, and it is finally decided in some cases that "there is a leak". Because there is no leak to the outside, it is actually correct to decide that "there is no leak". Due to the blowholes located inside, it is decided that "there is a leak". Such an erroneous decision also occurs with the conventional gauge-pressure leakage inspector 110.

(5) The periods of time for the pressure applying period T1 and the stable period T2 are determined according to the internal volume of the device under inspection. When many devices having a certain internal volume are checked, the pressure applying period T1 and the stable period T2 are set to have periods of time suited to the devices. When a device having a different internal volume is accidentally mixed during the inspection, inspection is performed in the pressure applying period T1 and the stable period T2, which are not suited to that device.

A second aspect of the present invention provides a method for detecting a fault in a leakage inspector that measures a change in air pressure inside a device in a state in which the air pressure inside the device is made higher than air pressure outside the device and checks whether or not the device has a leak according to the change in air pressure inside the device, the method comprising a calibration step and an inspection step, the calibration step comprising: a step of applying pressure to an inside of a first device serving as a reference device; a step of sealing air inside the first device; a step of calculating a differential value BB1 of pressure inside the first device with respect to time, at a first point that is elapsed a first predetermined period of time from an end point of the step of sealing the air inside the first device, and of storing the differential value BB1 in a storage section; and a step of calculating a differential value BB2 of the pressure inside the first device with respect to time, at a second point that is elapsed a second predetermined period of time from the first point, and of storing the differential value BB2 in the storage section; and the inspection step comprising: a step of applying pressure to an inside of a second device to be checked for a leak; a step of sealing air inside the second device; a step of calculating a differential value BB1' of pressure inside the second device with respect to time, at a third point that is elapsed the first predetermined period of time from an end point of the step of sealing the air inside the second device, and of storing the differential value BB1' in the storage section; and a step of calculating a differential value BB2' of the pressure inside the second device with respect to time, at a fourth point that is further elapsed the second predetermined period of time from the third point, and of storing the differential value BB2' in the storage section; a step of calculating a waveform ratio K as (BB1'–BB2')/(BB1–BB2); and a step of deciding whether an operation malfunction occurs by using the value of the waveform ratio K.

When the difference between the differential values calculated in the calibration step, BB1–BB2, is sufficiently larger than zero and the difference between the differential values calculated in the inspection step, BB1'–BB2', nearly equals zero, the waveform ratio K nearly equals zero. When the waveform ratio K nearly equals zero, it is estimated either that air pressure was not applied to the devices or that the measurement unit was inoperable, in the inspection step. Therefore, it is possible to detect an operation malfunction of a pneumatic apparatus of the leakage inspector.

After the calibration step, it is possible to apply only the inspection step to each of a plurality of second devices under inspection. In the inspection step of the present invention, self diagnosis is performed during the stable period, which is necessary in the leak inspection method. Therefore, extra time only for self diagnosis is not used in the present invention. In other words, even when self diagnosis for the leakage inspector and leak inspection are executed for all second devices under inspection, since extra time only for self diagnosis for the leakage inspector is not used, the leak inspection is finished within the same period of time as the conventional period of time for inspection.

In addition, since self diagnosis for the inspection apparatus is performed by using the differential values of pressure in the device under inspection in this method, the self diagnosis can be applied not only to pressure-difference leakage inspectors but also to gauge-pressure leakage inspectors.

When the value of the waveform ratio K is much larger than 1, the difference between the differential values calculated in the calibration step, BB1−BB2, and the difference between the differential values calculated in the inspection step, BB1'−BB2', have the following relationship:

$$BB1-BB2 \ll BB1'BB2'$$

From this situation, it can be estimated that the first device, serving as a reference device, measured in the calibration step, and the second device, serving as an actual measurement target, measured in the inspection step, have different properties.

A third aspect of the present invention provides a leakage inspector for measuring a change in air pressure inside a device in a state in which the air pressure inside the device is made higher than air pressure outside the device and for checking whether or not the device has a leak according to the change in air pressure inside the device, the leakage inspector comprising: a pneumatic source connected to the device through an air supply line, the pneumatic source adapted to apply pressure to an inside of the device; a valve capable of being opened and closed, the valve disposed in the air supply line; a measurement unit adapted to measure the pressure inside the device; a processor; and a storage section adapted to store a measured value obtained by the measurement unit; wherein the processor is adapted to control the execution of: a step of opening the valve and applying pressure to an inside of a first device serving as a reference device; a step of closing the valve and sealing air inside the first device; a step of making the measurement unit measure a pressure change B1 inside the first device, caused between an end point of the step of sealing the air inside the first device and a first point that is elapsed a predetermined period of time from the end point, and store the pressure change B1 in the storage section; and a step of making the measurement unit measure a pressure change B2 inside the first device, caused between the first point and a second point that is further elapsed the predetermined period of time from the first point, and store the pressure change B2 in the storage section; a step of opening the valve and applying pressure to an inside of a second device to be checked for a leak; a step of closing the valve and sealing air inside the second device; a step of making the measurement unit measure a pressure change B1' inside the second device, caused between an end point of the step of sealing the air inside the second device and a third point that is elapsed the predetermined period of time from the end point, and store the pressure change B1' in the storage section; and a step of making the measurement unit measure a pressure change B2' inside the second device, caused between the third point and a fourth point that is further elapsed the predetermined period of time from the third point, and store the pressure change B2' in the storage section; and the processor is adapted to execute: a step of calculating a waveform ratio K as (B1'−B2')/(B1−B2); and a step of deciding whether an operation malfunction occurs by using the value of the waveform ratio K.

A fourth aspect of the present invention provides a leakage inspector for measuring a change in air pressure inside a device in a state in which the air pressure inside the device is made higher than air pressure outside the device and for checking whether or not the device has a leak according to the change in air pressure inside the device, the leakage inspector comprising: a pneumatic source connected to the device through an air supply line, the pneumatic source adapted to apply pressure to an inside of the device; a valve capable of being opened and closed, the valve disposed in the air supply line; a measurement unit adapted to measure the pressure inside the device; a processor; and a storage section adapted to store a measured value obtained by the measurement unit; wherein the processor is adapted to control the execution of: a step of opening the valve and applying pressure to an inside of a first device serving as a reference device; a step of closing the valve and sealing air inside the first device; a step of calculating a differential value BB1 of pressure inside the first device with respect to time, at a first point that is elapsed a first predetermined period of time from an end point of the step of sealing the air inside the first device, and of storing the differential value BB1 in the storage section; a step of calculating a differential value BB2 of the pressure inside the first device with respect to time, at a second point that is elapsed a second predetermined period of time from the first point, and of storing the differential value BB2 in the storage section; a step of opening the valve and applying pressure to an inside of a second device to be checked for a leak; a step of closing the valve and sealing air inside the second device; a step of calculating a differential value BB1' of pressure inside the second device with respect to time, at a third point that is elapsed the first predetermined period of time from an end point of the step of sealing the air inside the second device, and of storing the differential value BB1' in the storage section; and a step of calculating a differential value BB2' of the pressure inside the second device with respect to time, at a fourth point that is further elapsed the second predetermined period of time from the third point, and of storing the differential value BB2' in the storage section; and the processor is adapted to execute: a step of calculating a waveform ratio K as (BB1'−BB2')/(BB1−BB2); and a step of deciding whether an operation malfunction occurs by using the value of the waveform ratio K.

In the third and fourth aspects of the present invention, it is preferred that the second device is a cast and the processor decides that the second device has a blowhole on the inner wall when the waveform ratio K equals 1 plus a predetermined value or more.

In the third and fourth aspects of the present invention, it is preferred that the processor decide whether or not the second device has a leak according to a change in air pressure inside the second device, and the processor decide that a malfunction occurs in one of the air supply line, the valve, and the measurement unit when it is decided that the difference between the waveform ratio K and zero equals a predetermined value or less.

In an example of the third aspect of the present invention, the measurement unit is a differential pressure gauge; and the pressure changes B1, B2, B1', and B2' are changes in pressure differences between the inside of the first device or the second device and an inside of a reference tank.

In an example of the fourth aspect of the present invention, the measurement unit is a differential pressure gauge; and the differential values BB1, BB2, BB1', and BB2' are differential values of pressure differences between the inside of the first device or the second device and an inside of a reference tank.

In another example of the third aspect of the present invention, the measurement unit is a pressure gauge; and the pressure changes B1, B2, B1', and B2' are changes in pressure inside the first device or the second device, with respect to atmospheric pressure.

In another example of the fourth aspect of the present invention, the measurement unit is a pressure gauge; and the differential values BB1, BB2, BB1', and BB2' are differential values of pressure inside the first device or the second device, with respect to atmospheric pressure.

A fifth aspect of the present invention, a method for detecting a fault in a leakage inspector that measures a change in air pressure inside a device in a state in which the air pressure inside the device is made higher than air pressure outside the device and checks whether or not the device has a leak according to the change in air pressure inside the device, the method comprising a calibration step and an inspection step, the calibration step comprising: a step of applying pressure to an inside of a first device serving as a reference device; a step of sealing air inside the first device; and a step of measuring a pressure change B1 inside the first device, caused between an end point of the step of sealing the air inside the first device and a point that is elapsed a predetermined period of time from the end point, and of storing the pressure change B1 in a storage section; and the inspection step comprising: a step of applying pressure to an inside of a second device to be checked for a leak; a step of sealing air inside the second device; a step of measuring a pressure change B1' inside the second device, caused between an end point of the step of sealing the air inside the second device and a point that is further elapsed the predetermined period of time from the end point, and of storing the pressure change B1' in the storage section; and a step of deciding that the leakage inspector malfunctions when the pressure changes B1 and B1' have a relationship $\gamma \cdot B1 + \delta > B1'$, where $\gamma$ and $\delta$ are constants.

In the fifth aspect of the present invention, the stable period, which is necessary, is used to measure the pressure change B1 serving as a reference in the calibration step and the pressure change B1' serving as a diagnosis target in the inspection step. And the magnitude relationship of these pressure changes is used for detecting the malfunctions of the leakage inspector.

In the calibration step, the first device, having no leak, is used to measure the pressure change B1 inside the first device. Therefore, this pressure change does not include a leak component, and only the pressure change caused by the adiabatic change of the sealed air is detected.

In contrast, the pressure change B1' measured in the inspection step is for the second device, which may have a leak. Therefore, when the leakage inspector works normally, the pressure changes B1 and B1', measured under such conditions, should always have the following relationship in an ideal state.

$$B1 \leq B1'$$

In the fifth aspect of the present invention, this phenomenon is used to compare the pressure change B1' in the second device measured in the stable period of the inspection step and the pressure change B1 measured in the calibration step, and it is decided that the inspector has a malfunction when the following condition is satisfied:

$$\gamma \cdot B1 + \delta > B1'$$

where $\gamma$ and $\delta$ are constants specified with an error taken into account.

After the calibration step, it is possible to apply only the inspection step to each of a plurality of second devices. In the inspection step of the present invention, self diagnosis is performed during the stable period, which is necessary in the leak inspection method. Therefore, extra time only for self diagnosis is not used in the present invention. In other words, even when self diagnosis for the leakage inspector and leak inspection are executed for all second devices, since extra time only for self diagnosis for the leak inspector is not used, the leak inspection is finished within the same period of time as the conventional period of time for inspection.

In addition, since self diagnosis for the inspector is performed by measuring the pressure changes in the device in this method, the self diagnosis can be applied not only to pressure-difference leakage inspectors but to gauge-pressure leakage inspectors.

A sixth aspect of the present invention provides a leakage inspector for measuring a change in air pressure inside a device in a state in which the air pressure inside the device is made higher than air pressure outside the device and for checking whether or not the device has a leak according to the change in air pressure inside the device, the leakage inspector comprising: a pneumatic source connected to the device through an air supply line, the pneumatic source adapted to apply pressure to an inside of the device; a valve capable of being opened and closed, the valve disposed in the air supply line; a measurement unit adapted to measure the pressure inside the device; a processor; and a storage section adapted to store a measured value obtained by the measurement unit; wherein the processor is adapted to control the execution of: a step of opening the valve and applying pressure to an inside of a first device serving as a reference device; a step of closing the valve and sealing air inside the first device; a step of making the measurement unit measure a pressure change B1 inside the first device, caused between an end point of the step of sealing the air inside the first device and a point that is elapsed a predetermined period of time from the end point, and store the pressure change B1 in the storage section; a step of opening the valve and applying pressure to an inside of a second device to be checked for a leak; a step of closing the valve and sealing air inside the second device; and a step of making the measurement unit measure a pressure change B1' inside the second device, caused between an end point of the step of sealing the air inside the second device and a point that is elapsed the predetermined period of time from the end point, and store the pressure change B1' in the storage section; and the processor is adapted to execute a step of deciding that the leakage inspector malfunctions when the pressure changes B1 and B1' have a relationship $\gamma \cdot B1 + \delta > B1'$, where $\gamma$ and $\delta$ are constants.

In an example of the sixth aspect of the present invention, the measurement unit is a differential pressure gauge, and the pressure changes B1 and B1' are changes in pressure differences between the inside of the first device or the second device and the inside of a reference tank.

In another example of the sixth aspect of the present invention, the measurement unit is a pressure gauge, and the pressure changes B1 and B1' are changes in pressure inside the first device or the second device, with respect to atmospheric pressure.

Effects of the Invention

As described above, the present invention allows a malfunction of a leakage inspector to be detected without using an extra period of time for self diagnosis.

In addition, the present invention allows a malfunction detection operation to be executed irrespective of the type of a leakage inspector, either a pressure-difference type or a gauge-pressure type.

BRIEF DESCRIPTION OF THE DRAWINGS

FIG. 2A is a graph showing a temporal change in the output of a variable-gain amplifier, FIG. 2B is a graph showing a timing signal C1 that is H (high) during a pressure applying period T1 and is L (low) during the other periods, FIG. 2C is a graph showing a timing signal C2 that is H during a stable period T2 and is L during the other periods, FIG. 2D is a graph showing a timing signal C3 that is H during an inspection period T3 and is L during the other periods, and FIG. 2E is a graph showing a timing signal C4 that is H during an air discharging period T4 and is L during the other periods;

FIG. 4A is a graph showing a change in measured pressure value output from a pressure gauge, FIG. 4B is a graph showing the output waveform of a variable-gain amplifier of a decision apparatus, FIG. 4C is a graph showing a timing signal C1 that is H (high) during a pressure applying period T1 and is L (low) during the other periods, FIG. 4D is a graph showing a timing signal C2 that is H during a stable period T2 and is L during the other periods, FIG. 4E is a graph showing a timing signal C3 that is H during an inspection period T3 and is L during the other periods, and FIG. 4F is a graph showing a timing signal C4 that is H during an air discharging period T4 and is L during the other periods;

Figure 1:
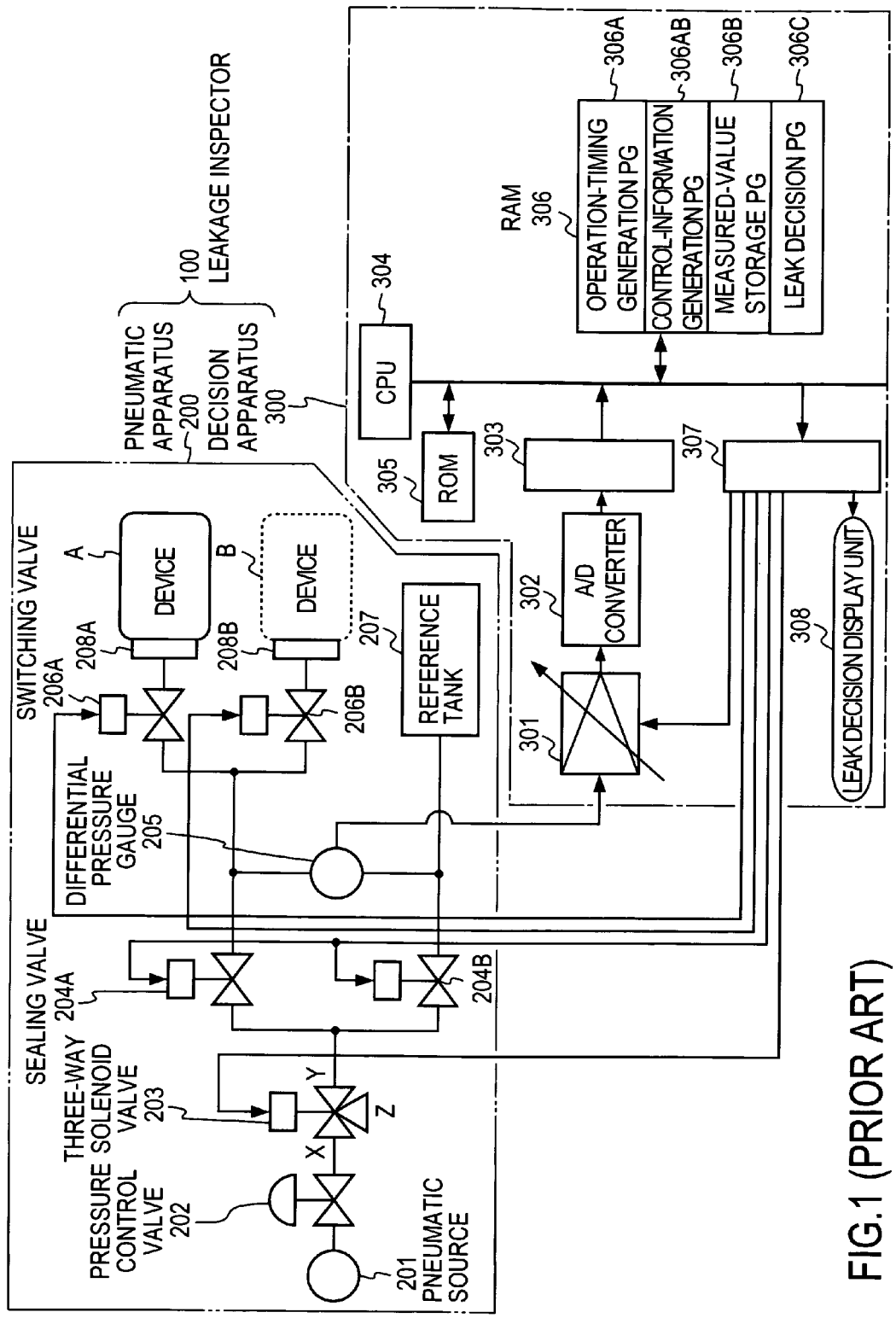
FIG. 1 is a diagram showing the structure of a conventional pressure-difference leakage inspector.
Figure 2:
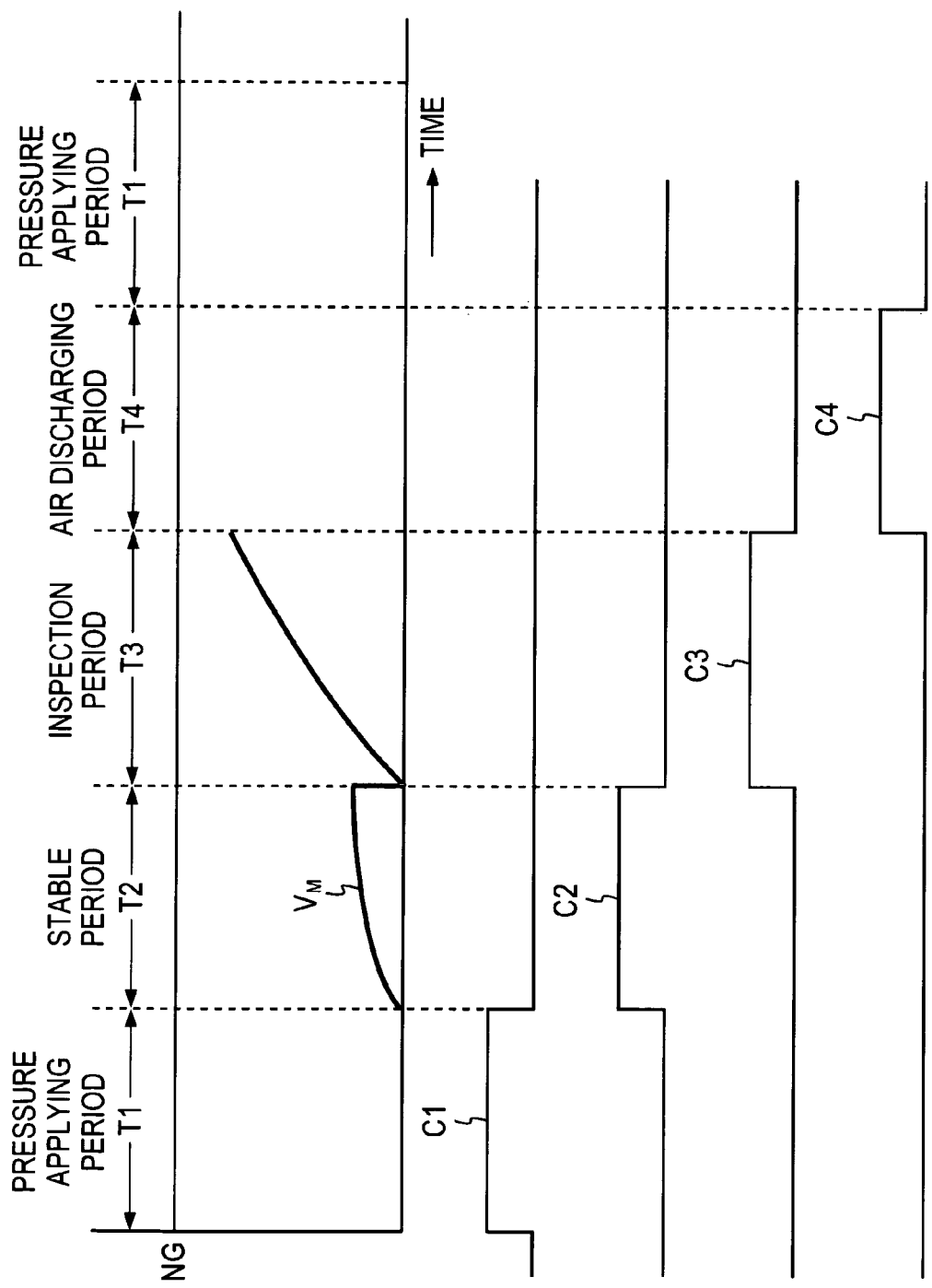
FIGS. 2A to 2E are graphs describing in outline the operation of the leakage inspector, where

DESCRIPTION OF REFERENCE NUMERALS 100, 110, 500, 510, 700, 710: Leakage inspectors
200, 400: Pneumatic apparatuses
300, 600, 610, 800, 810: Decision apparatuses

BEST MODES FOR CARRYING OUT THE INVENTION

Embodiments of the present invention will be described below with reference to the drawings.

First Embodiment

A first embodiment of the present invention will be described below.

<Outline>

In the first embodiment, the first and third aspects of the present invention are applied to a pressure-difference leakage inspector.

In the first embodiment, a stable period is divided into two halves in each of a calibration step and an inspection step; and the pressure change B1 or B1', described before, is measured in a first half period of the stable period, and the pressure change B2 or B2' is measured in a second half period.

The pressure changes B1 and B2 measured in the calibration step are stored in a storage section as (B1–B2), which is used for calculating a waveform ratio K in the inspection step. The pressure changes B1' and B2' measured in the inspection step, together with the decision of whether a device under inspection has a leak, are used for calculating the waveform ratio K, which equals (B1'–B2')/(B1–B2).

When the calculated waveform ratio K is nearly equal to 1, it can be presumed that the leakage inspector is operating normally.

When the calculated waveform ratio K is nearly equal to zero, it can be presumed that a pneumatic apparatus of the leakage inspector malfunctions, irrespective of a decision result of whether or not the device under inspection has a leak.

When the calculated waveform ratio K is much larger than 1, it can be almost presumed that the device under inspection has a property different from that of a reference device, irrespective of a decision result of whether or not the device has a leak.

<Details>

Figure 5:
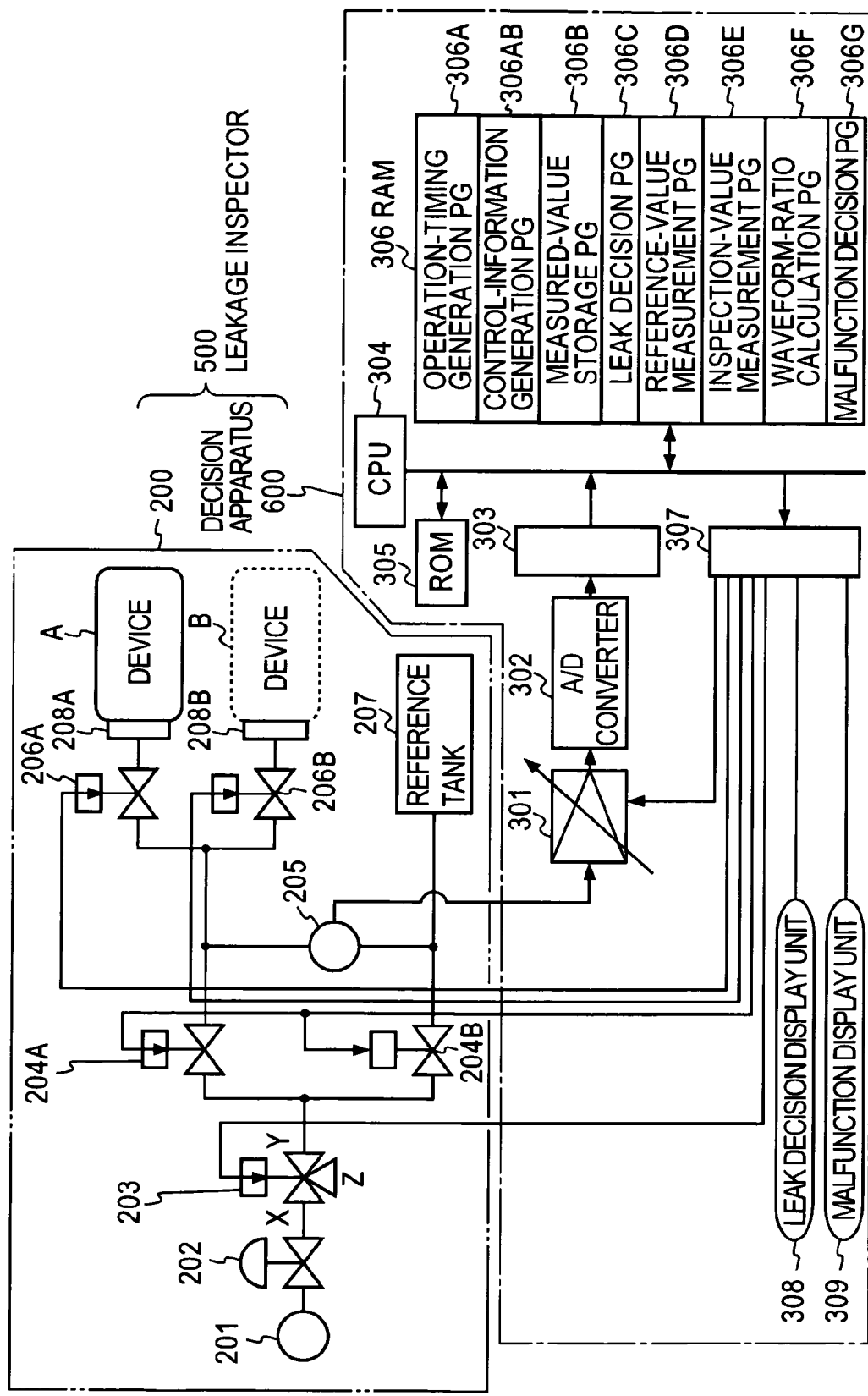
FIG. 5 is a diagram showing the structure of a leakage inspector of a first embodiment.

FIG. 5 is a view showing the structure of a leakage inspector 500 according to the first embodiment. In FIG. 5, the same symbols as those used in FIG. 1 are assigned to the same portions as those shown in FIG. 1, and a description thereof is simplified.

The leakage inspector 500 of the present embodiment comprises a pneumatic apparatus 200 and a decision apparatus 600. The pneumatic apparatus 200 has the same structure as the conventional one, described before. The pneumatic apparatus 200 includes a pneumatic source 201 for applying pressure to the inside of a device under inspection, such as a compressor; a pressure control valve 202 for controlling the amount of air output from the pneumatic source 201 to control the air pressure which the pneumatic source 201 applies to the outside to a predetermined air pressure; a three-way solenoid valve 203 capable of switching between a state (XY-port connection state) in which the air pressure controlled by the pressure control valve 202 is applied to devices A and B and to a reference tank 207 and a state (YZ-port connection state) in which air in the devices A and B and the reference tank 207 is discharged to the atmosphere; sealing valves 204A and 204B for sealing the inside air in a state in which the air pressure is applied to the inside of the device A or B and to the inside of the reference tank 207; a differential pressure gauge 205 (corresponding to "measurement unit") for measuring the pressure difference between the inside of the device A or B and the inside of the reference tank 207; switching valves 206A and 206B for switching between the devices A and B to which the air pressure is applied to allow one of the devices to be inspected while the other is replaced; the reference tank 207; and connection jigs 208A and 208B for connecting air supply lines to the devices A and B. One end of the air supply lines is connected to the outlet of the pneumatic source 201, the air supply lines supply air to the devices A and B and to the reference tank 207. As shown in FIG. 5, the pressure control valve 202, the three-way solenoid valve 203, the sealing valves 204A and 204B, and the switching valves 206A and 206B are disposed along the air supply lines.

The decision apparatus 600 includes a variable-gain amplifier 301 (with the gain being switched between a low gain and a high gain) for amplifying the output signal of the differential pressure gauge 205; an A/D converter 302; a microcomputer including an input port 303, a CPU 304, a ROM 305, a RAM 306, and an output port 307; a leak decision display unit 308; and a malfunction display unit 309 for displaying a malfunction of the leakage inspector 500 or a malfunction of a device under inspection when it is detected.

In the current case, the ROM 305 stores an operation-timing generation program, a control-information generation program, a measured-value storage program, a leak decision program, a reference-value measurement program, an inspection-value measurement program, a waveform-ratio calculation program, and a malfunction decision program that make the microcomputer operate as operation-timing generation means, control-information generation means, measured-value storage means, leak decision means, reference-value measurement means, inspection-value measurement means, waveform-ratio calculation means, and malfunction decision means, respectively. These programs are read from the ROM 305 and stored in the RAM 306 as an operation-timing generation program 306A, a control-information generation program 306AB, a measured-value storage program 306B, a leak decision program 306C, a reference-value measurement program 306D, an inspection-value measurement program 306E, a waveform-ratio calculation program 306F, and a malfunction decision program 306G when the microcomputer is started. The programs stored in the RAM 306 are read by the CPU 304, and the CPU 304 decodes and executes them to function as the above-described means.

A malfunction detection method according to the present embodiment is characterized in that the waveform ratio K is obtained during a stable period T2, which is disposed immediately before a leak inspection is performed, and a malfunction of the leakage inspector 500 or the device under inspection is determined according to the value of the waveform ratio K.

Figure 6:
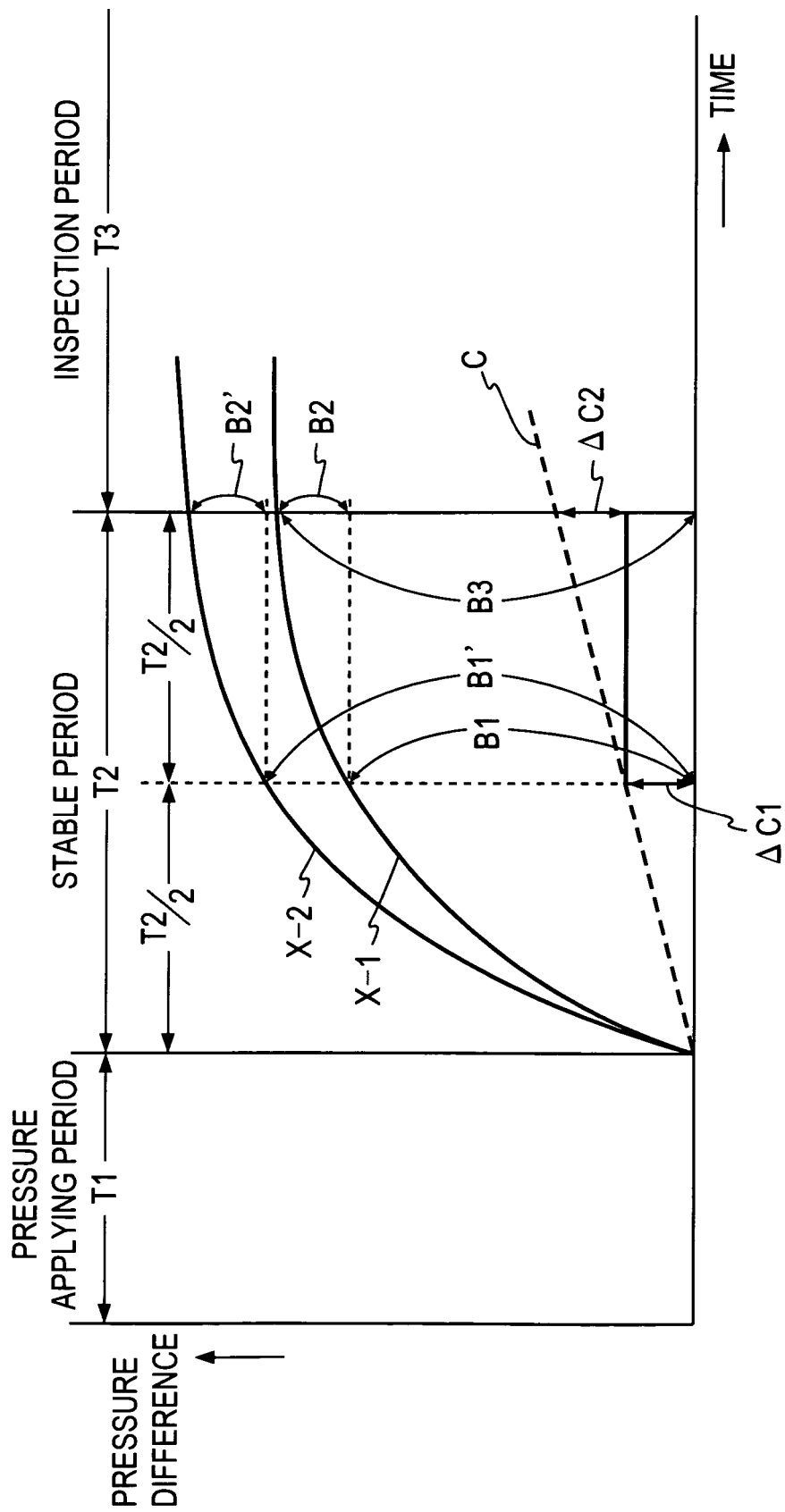
FIG. 6 is a graph showing example measurement conditions used to obtain a waveform ratio K.

FIG. 6 is a graph showing example measurement conditions used for obtaining the waveform ratio K. In the figure, the vertical axis indicates the pressure difference between the inside of the device A or B and the inside of the reference tank 207, and the horizontal axis indicates time. In FIG. 6, a curve X–1 shows a pressure-difference characteristic in the calibration step, and a curve X–2 shows a pressure-difference characteristic in the inspection step. A line C shows a pressure difference caused by a leak in the device under inspection, in the pressure difference detected between the inside of the device A or B and the inside of the reference tank 207. The malfunction detection method according to the present embodiment will be described below by referring to this figure, if necessary.

<<Calibration Step>>

The malfunction detection method according to the present embodiment includes the calibration step and the inspection step. In the calibration step, the device A or B (a first device) which serves as a no-leak reference device is connected to the connection jig 208A or 208B. When the device A is connected to the connection jig 208A, the switching valve 206A is made to open and the switching valve 206B is made to close. Conversely, when the device B is connected to the connection jig 208B, the switching valve 206B is made to open and the switching valve 206A is made to close.

Under such a state, operations are performed in a pressure applying period T1, the stable period T2, an inspection period T3, and an air discharging period T4. The following control is applied to the operation in each period.

The operation-timing generation means, configured when the CPU 304 reads the operation-timing generation program 306A, generates a timing signal corresponding to each period. The control-information generation means, configured when the CPU 304 reads the control-information generation program 306AB, generates control signals that make the three-way solenoid valve 203, the sealing valves 204A and 204B, and the variable-gain amplifier 301 execute actions in the periods indicated by the timing signals generated by the operation-timing generation means. The generated control signals are output from the output port 307 to the three-way solenoid valve 203, the sealing valves 204A and 204B, and the variable-gain amplifier 301. The three-way solenoid valve 203, the sealing valves 204A and 204B, and the variable-gain amplifier 301 perform the actions according to the control signals in the respective periods. The actions in each period will be described below.

In the pressure applying period T1, after the pneumatic source 201 is driven and the pressure control valve 202 is opened, the port X and the port Y are connected in the three-way solenoid valve 203, and the sealing valves 204A and 204B are made to open. With these actions, air pressure is applied to the inside of the device A or B (first device) and to the inside of the reference tank 207. This state is maintained until the pressure applying period T1 ends. When the pressure applying period T1 ends, the sealing valves 204A and 204B are made to close. With these actions, the air inside the device A or B, which serves as the first device, is sealed and the air inside the reference tank 207 is sealed.

In the next period, namely, the stable period T2, the pressure difference between the inside of the device A or B, which serves as the first device, and the inside of the reference tank 207 is measured. In the present embodiment, the stable period T2 is divided into two halves, and pressure changes B1 and B2 during the first half having a period of T2/2 and during the second half having a period of T2/2 are measured at the end of the first half and the end of the second half (see the curve X–1 in FIG. 6).

More specifically, the differential pressure gauge 205 is used to measure the pressure change B1 inside the device A or B, which serves as the first device, caused between the end of the pressure applying period T1 (which includes a step of applying pressure to the inside of the first device and a step of sealing the air in the inside) and a first point in time when a period of T2/2 elapses from the end of the pressure applying period T1 (during the first half having a period of T2/2, of the stable period T2), and the pressure change B1 is stored in the RAM 306. Then, the pressure change B2 inside the device A or B, which serves as the first device, caused between the first point and a second point in time when a period of T2/2 elapses further from the first point (during the second half having a period of T2/2, of the stable period T2) is measured, and the pressure change B2 is stored in the RAM 306. The "pressure change" in the present embodiment means a change in the pressure difference between the air pressure inside the device A or B to which the air pressure was applied and the air pressure inside the reference tank 207. The pressure change B2 can be obtained by subtracting B1 from B3, the B3 indicating the pressure change caused between the end of the pressure applying period T1 and the end of the stable period T2 in the calibration step. Then, the difference between the measured pressure changes B1 and B2, that is, B1−B2, is obtained and stored as a reference value in the RAM 306.

The measurement processing performed in the stable period T2 in the calibration step is controlled by the reference-value measurement means, configured when the CPU 304 reads the reference-value measurement program 306D. The processing to store the pressure changes B1 and B2 and the reference value (B1−B2) in the RAM 306 is controlled by the measured-value storage means, configured when the CPU 304 reads the measured-value storage program 306B.

Since the operations in the inspection period T3 and the air discharging period T4 are as described above, a description thereof is omitted here.

<<Inspection Step>>

The inspection step is repeated the same number of times as the number of devices to be checked for a leak.

In the inspection step, the device A or B (second device) to be checked for a leak is connected to the connection jig 208A or 208B. When the device A is connected to the connection jig 208A, the switching valve 206A is made to open and the switching valve 206B is made to close. Conversely, when the device B is connected to the connection jig 208B, the switching valve 206B is made to open and the switching valve 206A is made to close.

Under such a state, operations are performed in a pressure applying period T1, a stable period T2, an inspection period T3, and an air discharging period T4, as in the calibration step. Since the operations in the inspection period T3 and the air discharging period T4 are as described above, a description thereof is omitted here. The operations in the pressure applying period T1 and the stable period T2 will be described below.

In the pressure applying period T1, pressure is applied to the inside of the device A or B, which is the second device, and to the inside of the reference tank 207, and the air is sealed inside when the pressure applying period T1 is finished, in the same way as in the calibration step.

In the next period, namely, the stable period T2, the pressure difference between the inside of the device A or B, which serves as the second device, and the inside of the reference tank 207 is measured. In the present embodiment, the stable period T2 is divided into two halves, and pressure changes B1' and B2' during the first half having a period of T2/2 and during the second half having a period of T2/2 are measured at the end of the first half and the end of the second half (see the curve X−2 in FIG. 6).

More specifically, the pressure change B1' inside the device A or B, which serves as the second device, caused between the end of the pressure applying period T1 (which includes a step of applying pressure to the inside of the second device and a step of sealing the air in the inside) and a third point in time when a period of T2/2 elapses from the end of the pressure applying period T1 (during the first half having a period of T2/2, of the stable period T2) is measured, and the pressure change B1' is stored in the RAM 306. Then, the pressure change B2' inside the device A or B, which serves as the second device, caused between the third point and a fourth point in time when a further period of T2/2 elapses from the third point in time (during the second half having a period of T2/2, of the stable period T2) is measured, and the pressure change B2' is stored in the RAM 306. Then, the difference between the measured pressure changes B1' and B2', that is, B1'−B2', is obtained and stored as a measured value in the RAM 306. The measurement processing performed in the stable period T2 in the inspection step is controlled by the inspection-value measurement means, configured when the CPU 304 reads the inspection-value measurement program 306E. The processing to store the pressure changes B1' and B2' and the measured value (B1'−B2') in the RAM 306 is controlled by the measured-value storage means.

In the inspection step, whether or not the device A or B has a leak is indefinite. Even if the device has a leak, the influence of the leak is removed from the measured value (B1'−B2'), and as a result, the influence of the leak is removed from the waveform ratio K, because of the following reason.

Specifically, as indicated by the line C in FIG. 6, the pressure difference caused by a leak in the device under inspection, in the pressure difference measured between the inside of the device and the inside of the reference tank 207, increases at a constant rate as time passes. A pressure change ΔC1, caused by the leak in the device, of the measured pressure change B1' and a pressure change ΔC2, caused by the leak in the device, of the measured pressure change B2' are equal (ΔC1=ΔC2). Therefore, when the difference between the pressure changes B1' and B2' is calculated as the measured value (B1'−B2'), the components AC1 and AC2, caused by the leak in the device, are removed.

Next, the waveform-ratio calculation means, configured when the CPU 304 reads the waveform-ratio calculation program 306F, reads the reference value (B1−B2) and the measured value (B1'−B2') from the RAM 306 and calculates the waveform ratio K as (B1'−B2')/(B1−B2). The calculated waveform ratio K is stored in the RAM 306.

Then, the malfunction decision means, configured when the CPU 304 reads the malfunction decision program 306G, reads the waveform ratio K from the RAM 306, determines that the leakage inspector malfunctions when the difference between the waveform ratio K and 1 is a predetermined value or more, outputs the decision result from the output port 307, and outputs it from the malfunction display unit 309. The "predetermined value" is appropriately determined based on quality variations of no-leak devices under inspection. For example, when $K \leq 1-\alpha (0<\alpha \leq 1)$ or $K \geq 1+\beta (\beta >0)$, it is determined that the leakage inspector malfunctions. An example of value α is 0.3. An example of value β is 0.5. There is no upper limit for β, and β can be set to an appropriate value depending on the structure of the apparatus.

To be more specific, this waveform ratio K is used as an index to determine whether the curve X−2 (in FIG. 6), indicating the pressure-difference transition measured in each inspection step, closely resembles the curve X−1, indicating the pressure-difference transition measured in the calibration step. When K equals 1, it can be said that the curve X−2 in the inspection step closely resembles the curve X−1 in the calibration step. The more the waveform ratio K deviates from 1, the more the curve X−2 in the inspection step is separated from the curve X−1 in the calibration step, and it can be said that there is a high possibility that the leakage inspector malfunctions.

As in the example malfunction (1) of the leakage inspector, described before, for example, when leak inspection is conducted, if the port X and the port Y are not connected in the three-way solenoid valve 203, or if the sealing valves 204A and 204B are closed, because air pressure is not applied to the device under inspection or to the reference tank 207, the measured value (B1'−B2') nearly equals zero and the waveform ratio K nearly equals zero. The same situation also occurs if any of the air supply lines is clogged. When the waveform ratio K satisfies $K \leq 1-\alpha$ (when the waveform ratio K equals zero plus a predetermined value or less), the malfunction decision means determines that "the leakage inspector malfunctioned" without paying attention to the result of the leak inspection, and displays the decision result on the malfunction display unit 309.

As in the example malfunction (2) of the leakage inspector, described before, for example, when leak inspection is conducted, if the three-way solenoid valve 203 and the sealing valves 204A and 204B normally operate but the switching valves 206A and 206B are closed, the pressure changes B1' and B2' are close to zero. This is because the space inside the device A or B is separated from the region where the differential pressure gauge 205 performs measurement, by the switching valves 206A and 206B, and an adiabatic change only in the air supply lines converges within a short period of time.

Figure 7:
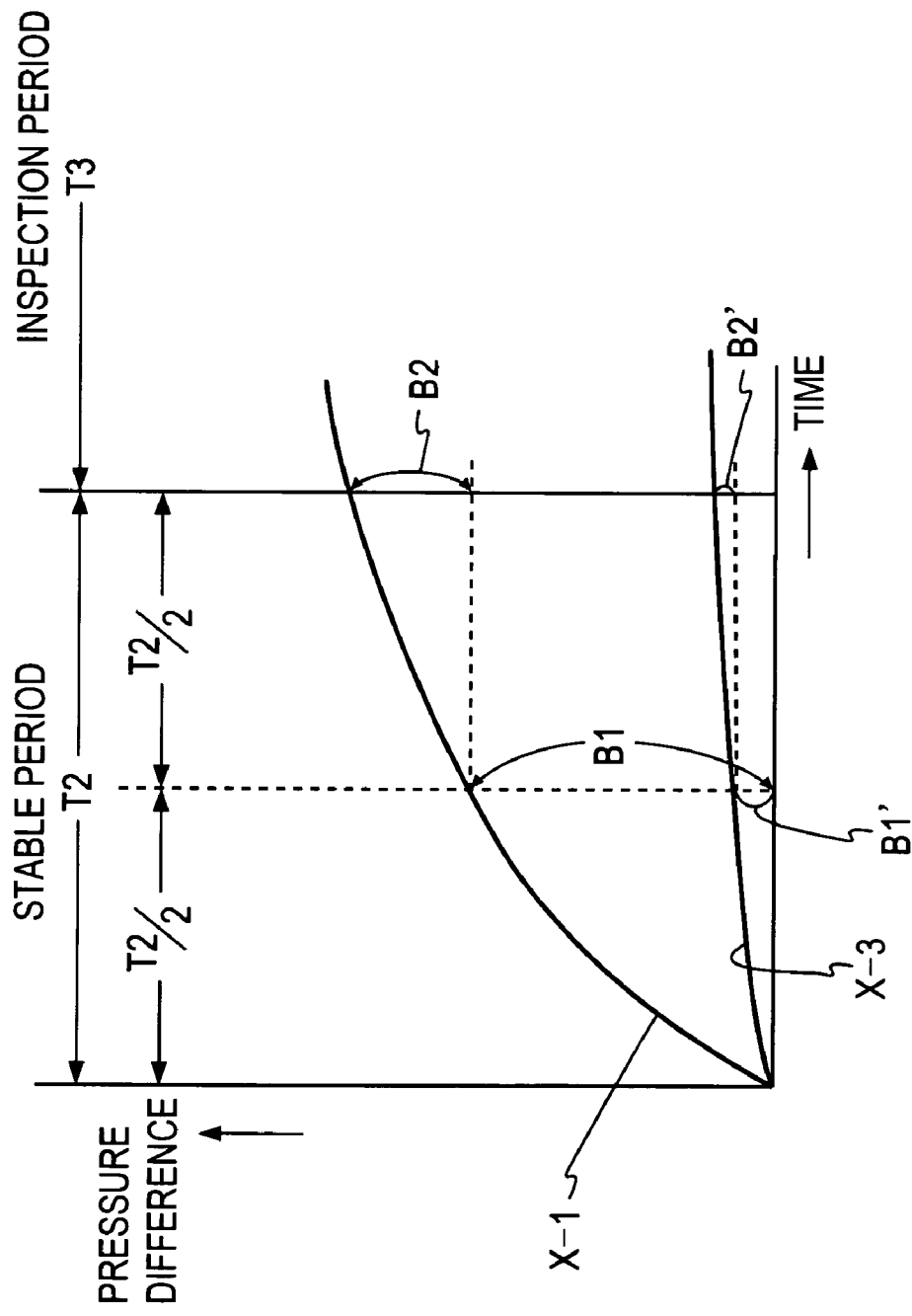
FIG. 7 is a graph showing the curve X–1, described before, and a curve X–3 indicating a temporal change in pressure difference between the inside of a device under inspection and the inside of a reference tank, measured in the state of an example malfunction (2)

FIG. 7 is a graph showing the curve X–1, described before, and a curve X–3 indicating the temporal change of the pressure difference between the inside of the device under inspection and the inside of the reference tank 207, measured in the state of the example malfunction (2). As indicated by the curve X–3 in FIG. 7, the pressure changes B1' and B2' are close to zero. As a result, the waveform ratio K, calculated by the waveform ratio calculation means, nearly equals zero. The same situation also occurs if any of the air supply lines is clogged. When the waveform ratio K satisfies K≦1–α α (when the waveform ratio K equals zero plus a predetermined value or less), the malfunction decision means determines that "the leakage inspector malfunctioned" without paying attention to the result of the leak inspection, and displays the decision result on the malfunction display unit 309.

As in the example malfunction (3) of the leakage inspector, described before, for example, if the differential pressure gauge 205 becomes inoperable, the pressure changes B1' and B2', measured in the inspection step, both become zero. Therefore, the waveform ratio K, calculated by the waveform ratio calculation means, nearly equals zero. When the waveform ratio K satisfies K≦1–α, the malfunction decision means determines that "the leakage inspector malfunctioned", irrespective of the leak inspection result, and displays the decision that the leakage inspector malfunctions on the malfunction display unit 309.

In other words, when the waveform ratio K satisfies K≦1–α, the malfunction decision means can determine that the differential pressure gauge 205 or one of the three-way solenoid valve 203, the sealing valves 204A and 204B, the switching valves 206A and 206B, and the air supply lines has a malfunction.

As in the example malfunction (4) of the leakage inspector, described before, for example, if the device under inspection is a cast and has a blowhole on its inner wall, this condition is equivalent to an increased internal volume of the device. In that case, as indicated by the curve X–2 in FIG. 6, a change in pressure difference inside the device under inspection having the internal blowhole is larger than a change in pressure difference of the device serving as a reference, indicated by the curve X–1. It is clearly understood from FIG. 6 that the pressure change B1' is larger than the pressure change B1. As a result, (B1'–B2')>(B1–B2), and the waveform ratio K is larger than 1. Therefore, when K equals 1 plus a predetermined value or more, even if the leak inspection result shows that "there is a leak", the malfunction decision means determines that the decision of the leakage inspector is wrong. Since the device under inspection is a cast in this case, the determination is equivalent to an indication of a blowhole existing on the inner wall of the device. For example, information indicating that the device under inspection is a cast may be input to the malfunction decision means to make the malfunction decision means determine that the device under inspection has a blowhole on the inner wall and display the result on the malfunction display unit 309 when K≧1+β. When the waveform ratio K is not 1 but close to 1, the difference between the waveform ratio K and 1 may be regarded as error caused by a noise and the device under inspection may be regarded as a valid device. When the waveform ratio K deviates greatly from 1, it may be determined that the device under inspection has a blowhole on the inner wall or that the apparatus malfunctions.

The configuration of the present embodiment can detect a case where, for example, when a large number of devices having a certain inner volume are checked, a device having a different inner volume is accidentally mixed, as in the example malfunction (5) of the leakage inspector, described before.

More specifically, as clearly shown in the above description, pressure is applied to the inside of a second device having the same volume as a first device serving as a reference, in a reference pressure applying condition (in a pressure applying period T1). Then, a pressure change in the device sealed with the sealing valves 204A and 204B is measured by the differential pressure gauge 205 to obtain the waveform ratio K. Therefore, when the inner volume of the second device is different from that of the first device, the waveform ratio K deviates from 1. Among situations where the waveform ratio K deviates from 1, when the waveform ratio K is close to 1, the difference may be regarded to be caused by a noise and the device may be regarded as a valid device. When the waveform ratio K deviates greatly from 1, it may be determined that the device has a different property or that the leakage inspector malfunctions. For example, when K≦1–α' (0<α'≦1) or K≧1+β'(β'>0), the malfunction decision means may determine that the second device, which is a measurement target, has a different property from the other devices under inspection. An example of value α' is 0.5. An example of value β' is 1. There is no upper limit for β', and β' can be set to an appropriate value depending on the structure of the apparatus.

As described above, according to the present embodiment, it is possible to detect not only a malfunction of the leakage inspector but also a device under inspection having a different property. By combining the malfunction decision result and the leak inspection result, it is possible to estimate where a malfunction exists.

The present invention is not limited to the above-described embodiment. In the above embodiment, the stable period T2 is divided into two halves, the first and third points are set when a period of T2/2 elapses from the end of the pressure applying period T1, and the second and fourth points are set when a further period of T2/2 elapses from the first and third points. However, for example, these points may be specified such that the first and third points are set when a predetermined period of time other than a period of T2/2 elapses from the end of the pressure applying period T1, and the second and fourth points are set when the predetermined period of time further elapses from the first and third points.

Second Embodiment

A second embodiment of the present invention will be described below.

In the second embodiment, the first and third aspects of the present invention are applied to a gauge-pressure leakage inspector. In the following description, differences from the first embodiment are mainly described, and descriptions of items common to the first embodiment are omitted.

Figure 3:
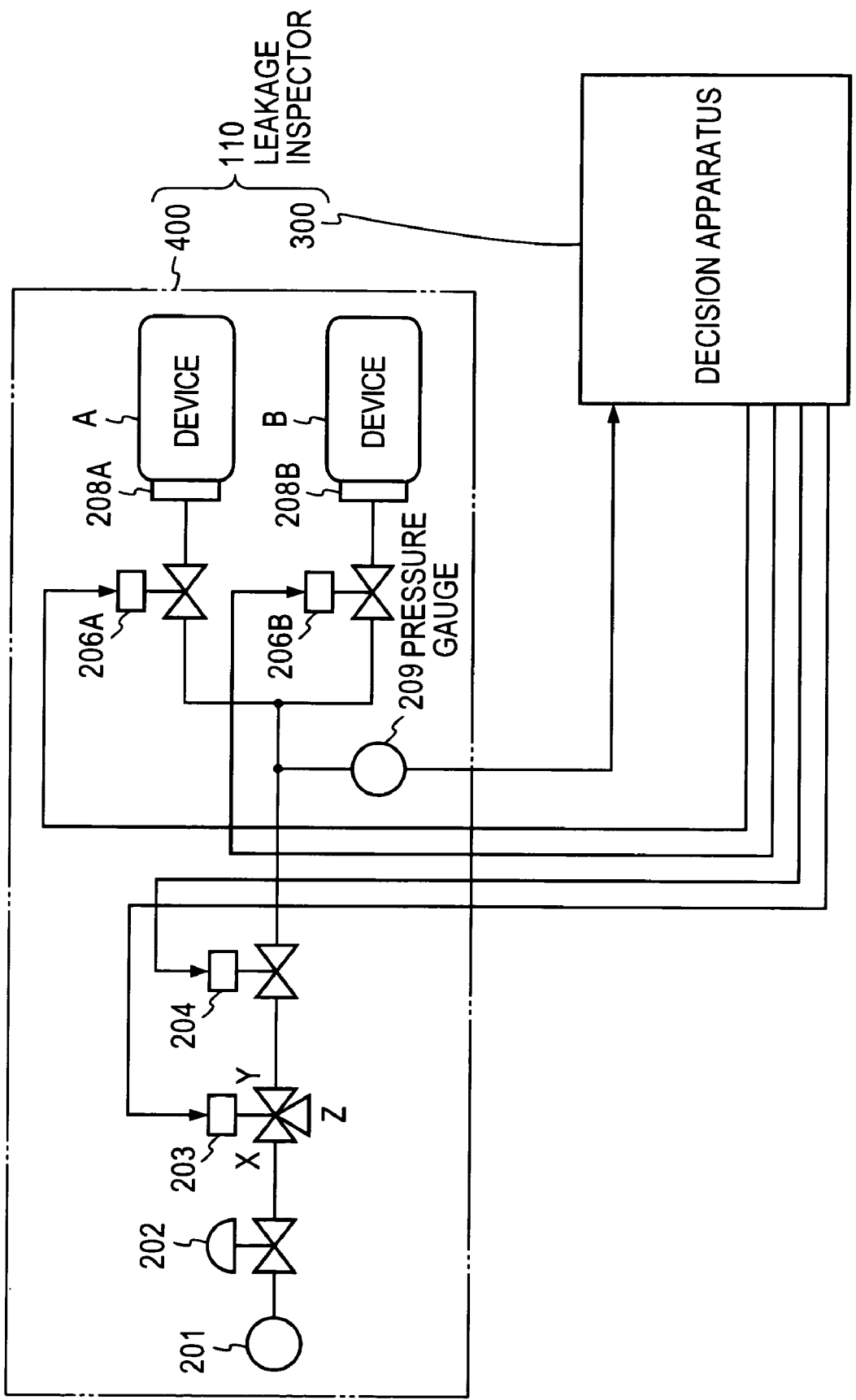
FIG. 3 is a diagram showing the structure of a conventional gauge-pressure leakage inspector.
Figure 8:
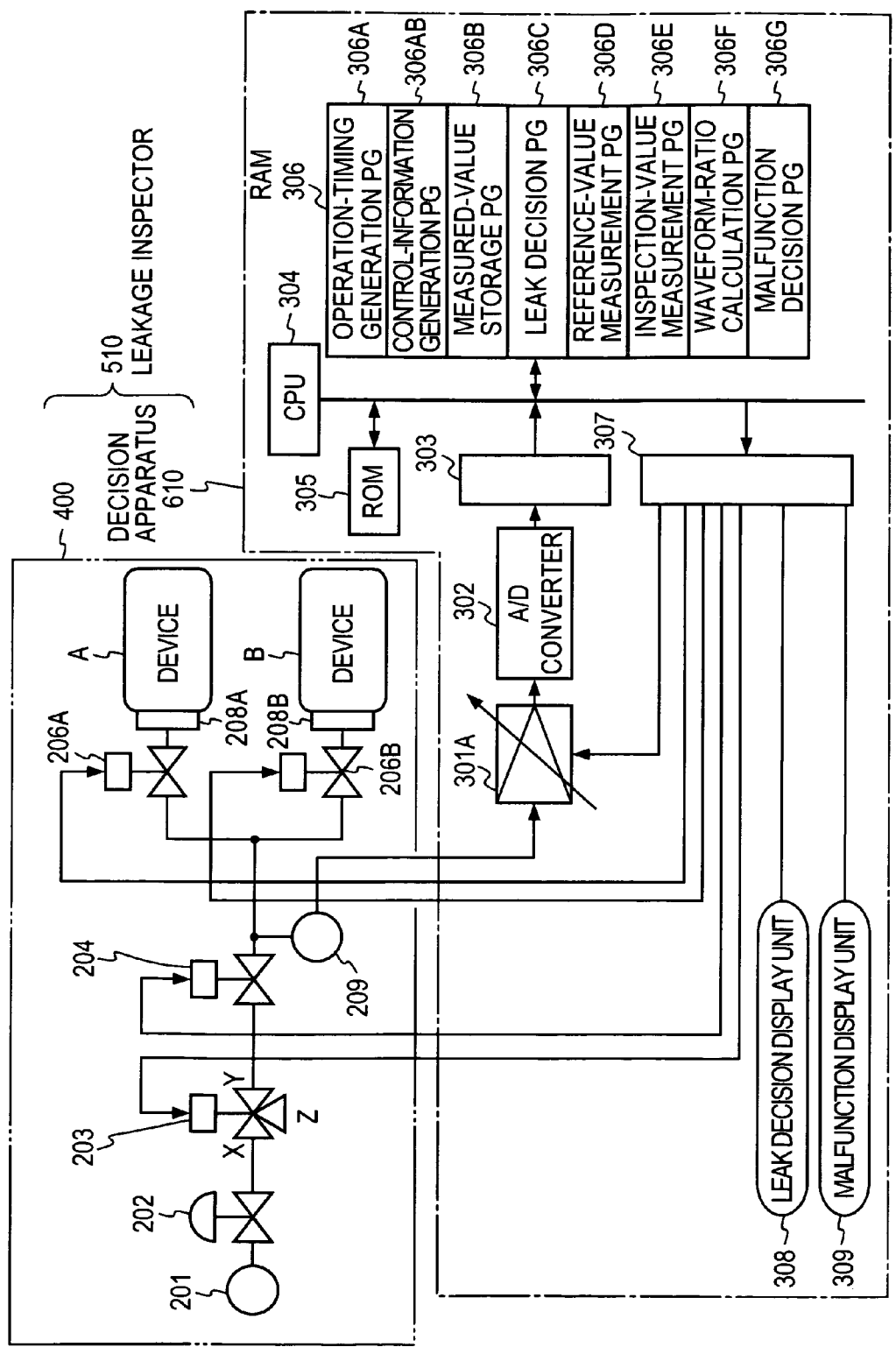
FIG. 8 is a diagram showing the structure of a leakage inspector of a second embodiment.

FIG. 8 is a view showing the structure of a leakage inspector 510 according to the second embodiment. In FIG. 8, the same symbols as those used in FIG. 3 and FIG. 5 are assigned to the same portions as those shown in FIG. 3 and FIG. 5, and a description thereof is simplified.

The leakage inspector 510 of the present embodiment comprises a pneumatic apparatus 400 and a decision apparatus 610. The pneumatic apparatus 400 has the same structure as described conventional one. The decision apparatus 610 includes a variable-gain amplifier 301A (with the gain being switched between a low gain and a high gain) for amplifying the output signal of a pressure gauge 209 (corresponding to a "measurement unit"); an A/D converter 302; a microcomputer including an input port 303, a CPU 304, a ROM 305, a RAM 306, and an output port 307; a leak decision display unit 308; and a malfunction display unit 309.

A malfunction detection method according to the present embodiment will be described below.

<<Calibration Step>>

In a calibration step, a device A or B (a first device) which serves as a no-leak reference device is connected to a connection jig 208A or 208B.

In a pressure applying period T1, after a pneumatic source 201 is driven and a pressure control valve 202 is opened, a port X and a port Y are connected in a three-way solenoid valve 203, and sealing valves 204A and 204B are made to open. With these actions, a test pressure TP is applied to the inside of the device A or B (first device). This state is maintained until the pressure applying period T1 ends. When the pressure applying period T1 ends, the sealing valves 204A and 204B are made to close. With these actions, the air is sealed inside the device A or B, which serves as the first device.

In the next period, a stable period T2, the pressure inside the device A or B, which serves as the first device, is measured with respect to atmospheric pressure. In the present embodiment, the stable period T2 is divided into two halves, and pressure changes B1 and B2 during the first half having a period of T2/2 and during the second half having a period of T2/2 are measured at the end of the first half and the end of the second half.

More specifically, the pressure gauge 209 is used to measure the pressure change B1 inside the device A or B, which serves as the first device, caused between the end of the pressure applying period T1 (which includes a step of applying pressure to the inside of the first device and a step of sealing the air inside) and a first point in time when a period of T2/2 elapses from the end of the pressure applying period T1 (during the first half having a period of T2/2, of the stable period T2), and the pressure change B1 is stored in the RAM 306. Then, the pressure change B2 inside the device A or B, which serves as the first device, caused between the first point and a second point in time when a period of T2/2 elapses further from the first point (during the second half having a period of T2/2, of the stable period T2) is measured, and the pressure change B2 is stored in the RAM 306. The "pressure change" in the present embodiment means a change in the pressure inside the device A or B with respect to atmospheric pressure. Then, the difference between the measured pressure changes B1 and B2, that is, B1–B2, is obtained and stored as a reference value in the RAM 306.

The measurement processing performed in the stable period T2 in the calibration step is controlled by reference-value measurement means. The processing to store the pressure changes B1 and B2 and the reference value (B1–B2) in the RAM 306 is controlled by measured-value storage means.

Since operations in an inspection period T3 and an air discharging period T4 are as described above, a description thereof is omitted here.

<<Inspection Step>>

An inspection step is repeated the same number of times as the number of devices to be checked for a leak.

In the inspection step, the device A or B (second device) to be checked for a leak is connected to the connection jig 208A or 208B, as in the first embodiment.

Under such a state, operations are performed in a pressure applying period T1, a stable period T2, an inspection period T3, and an air discharging period T4, as in the calibration step. Since the operations in the inspection period T3 and the air discharging period T4 are as described above, a description thereof is omitted here. The operations in the pressure applying period T1 and the stable period T2 will be described below.

In the pressure applying period T1, pressure is applied to the inside of the device A or B, which is the second device, and the air is sealed inside when the pressure applying period T1 is finished, in the same way as in the calibration step.

In the next period, namely, the stable period T2, the pressure inside the device A or B, which serves as the second device, is measured. In the present embodiment, the stable period T2 is divided into two halves, and pressure changes B1' and B2' during the first half having a period of T2/2 and during the second half having a period of T2/2 are measured at the end of the first half and the end of the second half, respectively.

More specifically, the pressure change B1' inside the device A or B, which serves as the second device, caused between the end of the pressure applying period T1 (which includes a step of applying pressure to the inside of the second device and a step of sealing the air inside) and a third point in time when a period of T2/2 elapses from the end of the pressure applying period T1 (during the first half having a period of T2/2, of the stable period T2) is measured, and the pressure change B1' is stored in the RAM 306. Then, the pressure change B2' inside the device A or B, which serves as the second device, caused between the third point and a fourth point in time when a further period of T2/2 elapses from the third point in time (during the second half having a period of T2/2, of the stable period T2) is measured, and the pressure change B2' is stored in the RAM 306. Then, the difference between the measured pressure changes B1' and B2', that is, B1'–B2', is obtained and stored as a measured value in the RAM 306. The measurement processing performed in the stable period T2 in the inspection step is controlled by inspection-value measurement means. The processing to store the pressure changes B1' and B2' and the measured value (B1'–B2') in the RAM 306 is controlled by the measured-value storage means.

Then, malfunction decision means reads a waveform ratio K calculated as in the first embodiment, from the RAM 306, determines that the leakage inspector malfunctions when the difference between the waveform ratio K and 1 is a predetermined value or more, outputs the decision result from the output port 307, and displays it on the malfunction display unit 309, in the same way as in the first embodiment.

As in the example malfunction (1) of the leakage inspector, described before, for example, when leak inspection is conducted, if the port X and the port Y are not connected in the three-way solenoid valve 203, or if the sealing valve 204 is closed, because air pressure is not applied to the device under inspection, the measured value (B1'–B2') nearly equals zero and the waveform ratio K nearly equals zero. Therefore, when the waveform ratio K satisfies K≦1−α (when the waveform ratio K equals zero plus a predetermined value or less), it can be determined that "the leakage inspector malfunctioned."

As in the example malfunction (2) of the leakage inspector, described before, for example, when leak inspection is conducted, if the three-way solenoid valve 203 and the sealing valve 204 normally operate but switching valves 206A and 206B are closed, the pressure changes B1' and B2' are close to zero. This is because the space inside the device A or B is separated from the region where the pressure gauge 209 performs measurement, by the switching valve 206A or 206B, and an adiabatic change only in the air supply lines converges within a short period of time. As a result, also in the gauge-pressure leakage inspector 510, if the switching valves 206A and 206B are closed, the waveform ratio K nearly equals zero. Therefore, when the waveform ratio K satisfies K≦1−α (when the waveform ratio K equals zero plus a predetermined value or less), it can be determined that "the leakage inspector malfunctioned."

As in the example malfunction (3) of the leakage inspector, described before, for example, if the pressure gauge 209 becomes inoperable, pressure cannot be detected. Therefore, the pressure changes B1' and B2', which should have been measured in the inspection step, both become zero. As a result, the waveform ratio K nearly equals zero. Therefore, when the waveform ratio K satisfies K≦1−α, it can be determined that "the leakage inspector malfunctioned", irrespective of the leak inspection result.

As in the example malfunction (4) of the leakage inspector, described before, for example, if the device under inspection is a cast and has a blowhole on its inner wall, this condition is equivalent to an increased internal volume of the device. In that case, a change in pressure inside the device having the internal blowhole is larger than a change in pressure of the device serving as a reference. As a result, (B1'−B2') is larger than (B1−B2), and the waveform ratio K is larger than 1. Therefore, when the difference K equals 1 plus a predetermined value or more, even if the leak inspection result shows that "there is a leak", the malfunction decision means can determine that the decision of the leakage inspector is wrong. Since the device is a cast in this case, the determination is equivalent to an indication of a blowhole existing on the inner wall of the device. For example, information indicating that the device is a cast may be input to the malfunction decision means to make the malfunction decision means determine that the device has a blowhole at the inner wall and display the result on the malfunction display unit 309 when K≧1+β.

In the same way as in the first embodiment, the configuration of the present embodiment can detect a case where a device having a different inner volume is accidentally mixed with a large number of devices having a certain inner volume, the devices being checked, for example, as described in the example malfunction (5) of the leakage inspector.

As described above, according to the present embodiment, it is possible to detect not only a malfunction of the leakage inspector but also a device under inspection having a different property. By combining the malfunction decision result and the leak inspection result, it is possible to estimate where a malfunction exists.

Third Embodiment

A third embodiment is a modification of the first and second embodiments. Only differences from the first and second embodiments will be described below.

In the first and second embodiments, the methods for calculating the waveform ratio K from the pressure changes B1 and B2 and B1' and B2' are described. In the present embodiment, a waveform ratio K is calculated from values BB1 and BB2 and BB1' and BB2' obtained by differentiating the pressure inside a device under inspection with respect to time, instead of the pressure changes B1 and B2 and B1' and B2'.

Figure 9:
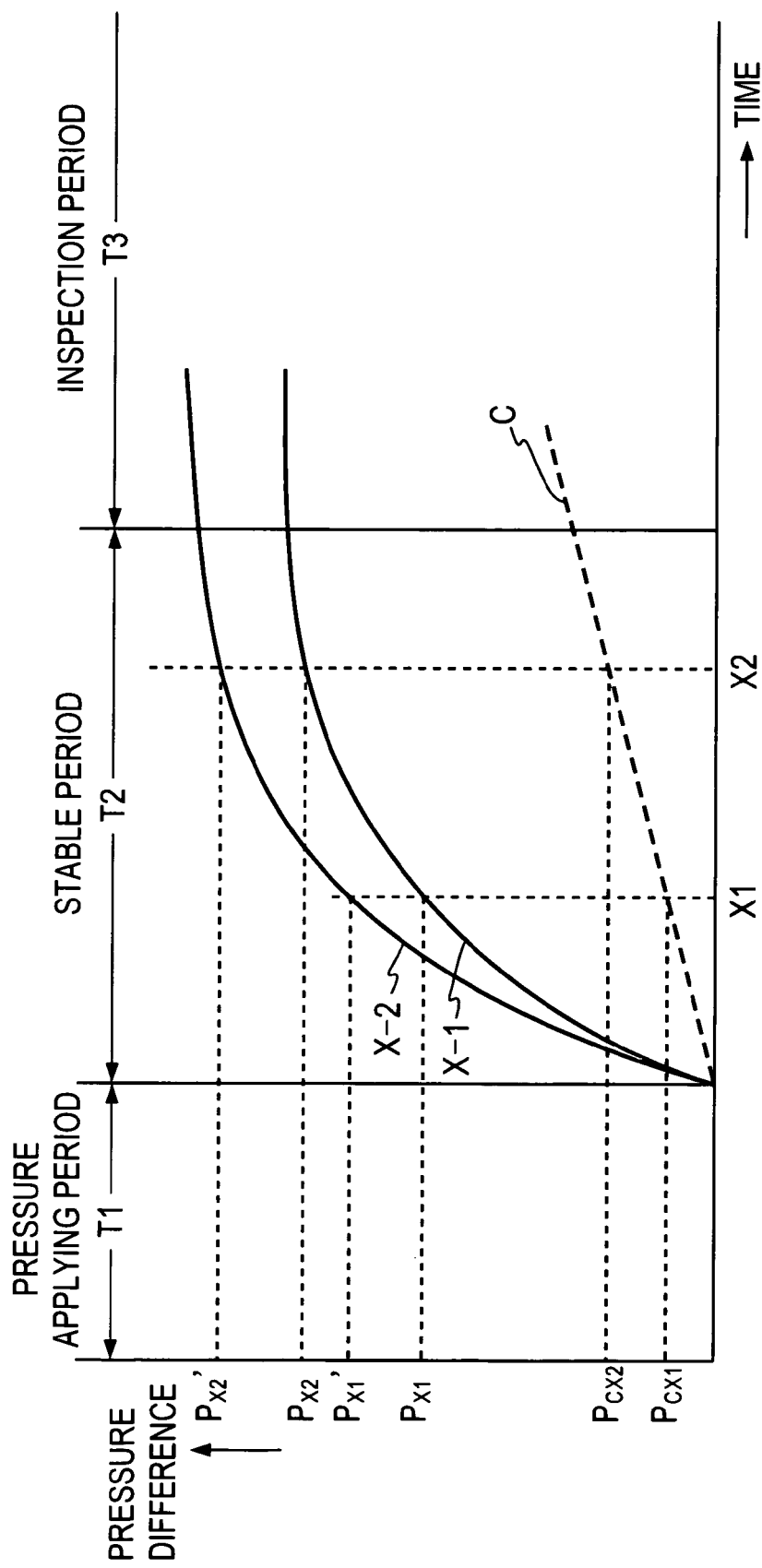
FIG. 9 is a graph showing example measurement conditions used to obtain a waveform ratio K by using differential values in a pressure-difference leakage inspector.

FIG. 9 is a graph showing example measurement conditions used for obtaining the waveform ratio K from differential values in a pressure-difference leakage inspector. In the figure, the vertical axis indicates the pressure difference between the inside of a device A or B and the inside of a reference tank 207, and the horizontal axis indicates time. In FIG. 9, a curve X−1 shows a pressure-difference characteristic in a calibration step, and a curve X−2 shows a pressure-difference characteristic in an inspection step.

In the present embodiment, values $dP_{x1}'/dt=BB1$, $dP_{x2}'/dt=BB2$, $dP_{x1}'/dt=BB1'$, and $dP_{x2}'/dt=BB2'$ obtained by differentiating the pressure inside the device with respect to time at any two points in time, namely, a time X1 (corresponding to "the first point" and "the third point") and a time X2 (corresponding to "the second point" and "the fourth point") in a stable period T2, are used to calculate the waveform ratio K, that is, K=(BB1'−BB2')/(BB1−BB2). In pressure-difference leakage inspectors, the "values obtained by differentiating the pressure inside the device with respect to time" mean values obtained by differentiating the pressure difference between the pressure inside the device and the pressure inside the reference tank 207 with respect to time.

Also in gauge-pressure leakage inspectors, the waveform ratio K can be obtained in the same way by K=(BB1'−BB2')/(BB1−BB2). In the gauge-pressure leakage inspectors, the "values obtained by differentiating the pressure inside the device with respect to time" mean values obtained by differentiating the pressure inside the device with respect to time.

Also when the differential values are used, it can be estimated that the pneumatic apparatus 400 malfunctions when K nearly equals zero and that the device has a blowhole on its inner wall or the device has a different property when K is much larger than 1, in the same way as described above.

Fourth Embodiment

A fourth embodiment of the present invention will be described below.

<Outline>

In the fourth embodiment, the fifth and sixth aspects of the present invention are applied to a pressure-difference leakage inspector.

In the fourth embodiment, pressure changes B1 and B1' are measured in each of a calibration step and an inspection step. The measured pressure changes B1 and B1' are used to detect a malfunction of the leakage inspector.

<Details>

Figure 10:
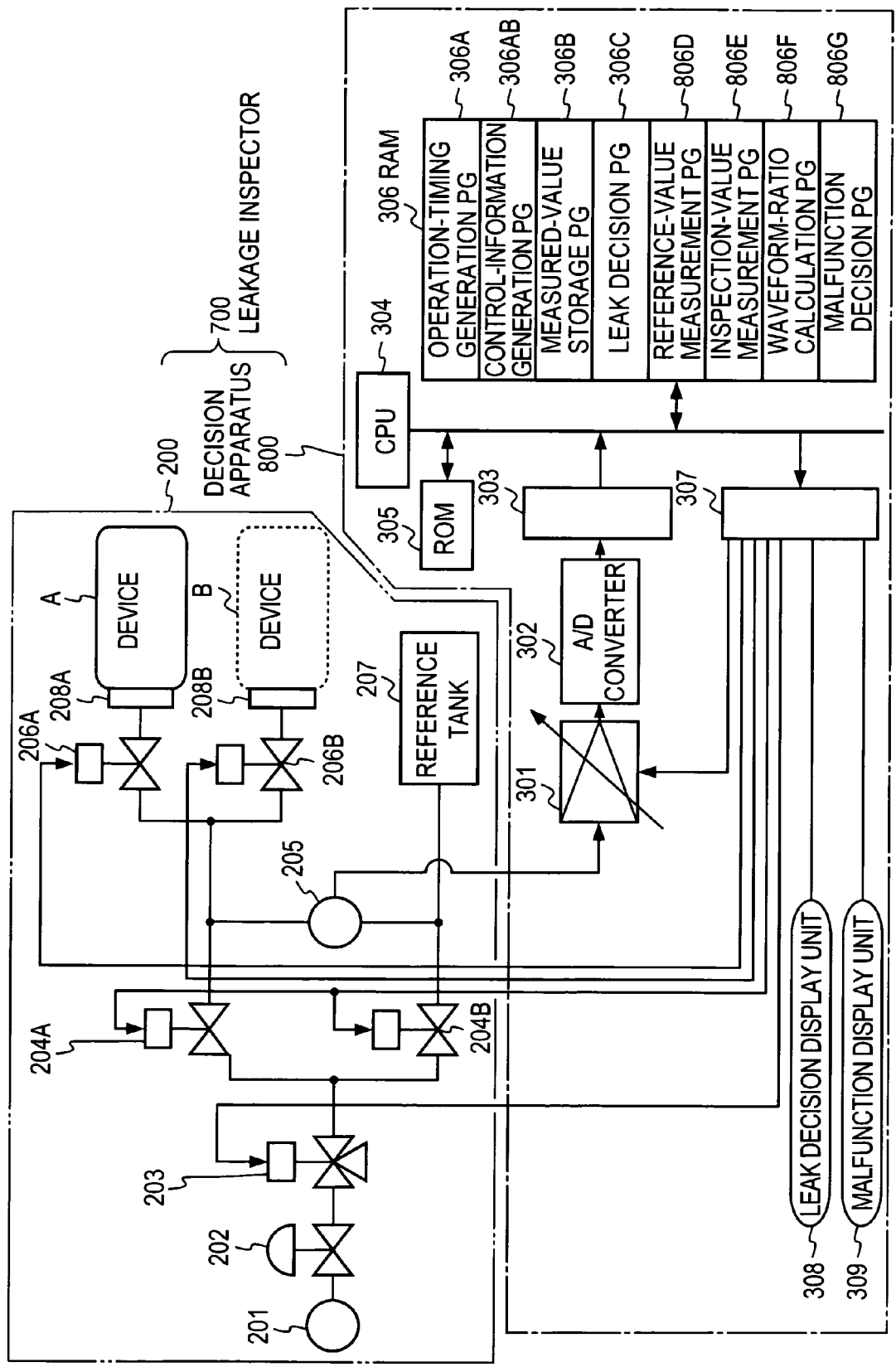
FIG. 10 is a diagram showing the structure of a leakage inspector of a fourth embodiment.

FIG. 10 is a view showing the structure of a leakage inspector 700 according to the fourth embodiment. In FIG. 10, the same symbols as those used in FIG. 1 and FIG. 5 are assigned to the same portions as those shown in FIG. 1 and FIG. 5, and a description thereof is simplified.

The leakage inspector 700 of the present embodiment comprises a pneumatic apparatus 200 and a decision apparatus 800. Since the pneumatic apparatus 200 has the same structure as the conventional one, described before, and as that in the first embodiment, a description thereof is omitted here. The decision apparatus 800 of the present embodiment differs from the decision apparatus 600 of the first embodiment in that a reference-value measurement program, an inspection-value measurement program, a waveform-ratio calculation program, and a malfunction decision program read by a CPU 304 have different contents. FIG. 10 shows these programs as a reference-value measurement program 806D, an inspection-value measurement program 806E, a waveform-ratio calculation program 806F, and a malfunction decision program 806G.

A malfunction detection method according to the present embodiment is also characterized in that a waveform ratio K is obtained during a stable period T2, which is disposed immediately before a leak inspection is performed, and a malfunction of the leakage inspector 700 or a device under inspection is determined according to the value of the waveform ratio K.

Figure 11:
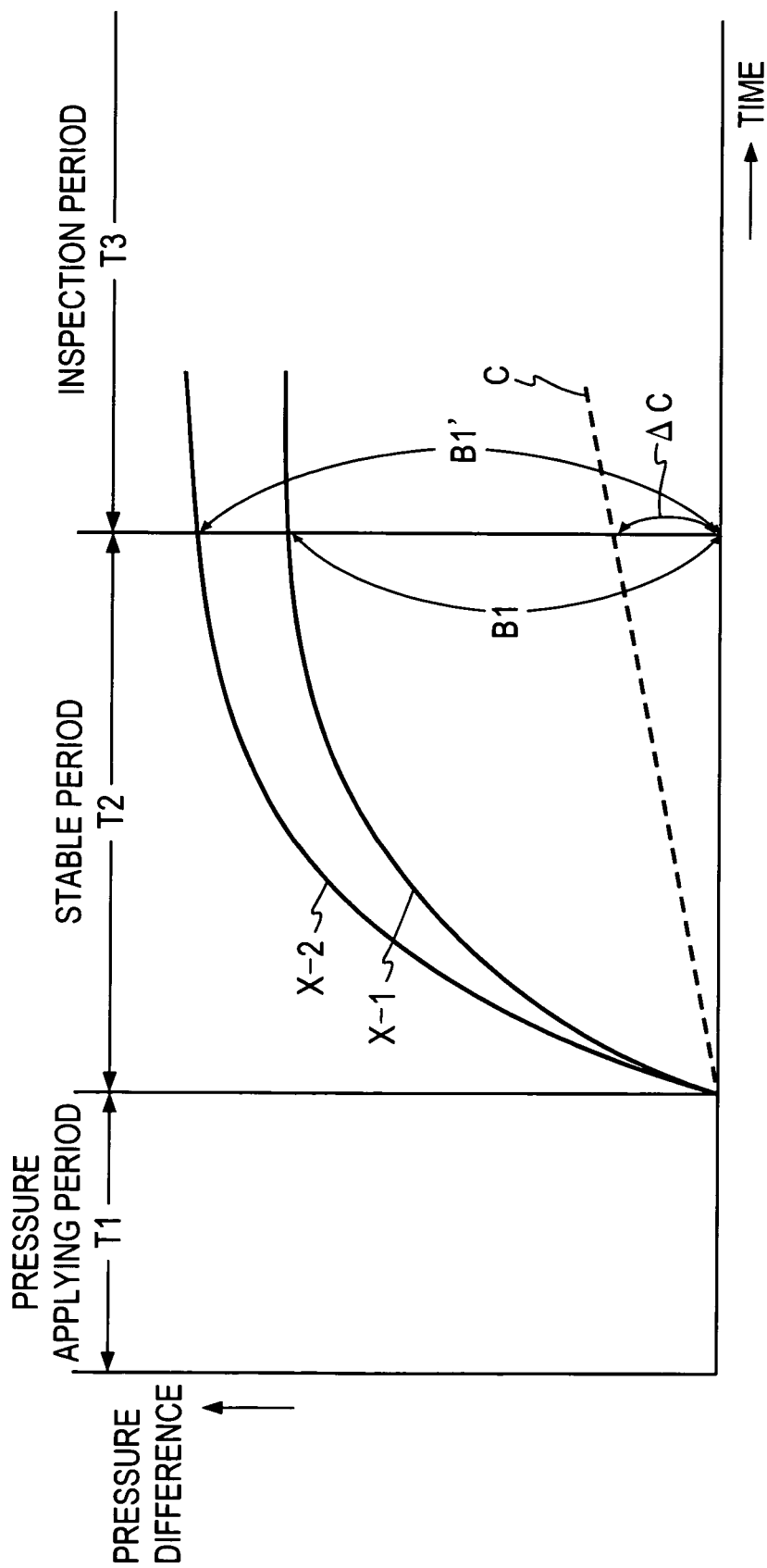
FIG. 11 is a graph showing example measurement conditions used to obtain a waveform ratio K in the fourth embodiment.

FIG. 11 is a graph showing example measurement conditions used for obtaining the waveform ratio K in the present embodiment. In the figure, the vertical axis indicates the pressure difference between the inside of a device A or B and the inside of a reference tank 207, and the horizontal axis indicates time. In FIG. 11, a curve X–1 shows a pressure-difference characteristic in the calibration step, and a curve X–2 shows a pressure-difference characteristic in the inspection step. A line C shows a pressure difference caused by a leak in the device under inspection, in the pressure difference obtained between the inside of the device A or B and the inside of the reference tank 207. The malfunction detection method according to the present embodiment will be described below by referring to this figure, if necessary.

<<Calibration Step>>

The malfunction detection method according to the present embodiment also includes the calibration step and the inspection step.

In the calibration step, the device A or B (a first device), which serves as a no-leak reference device, is connected to a connection jig 208A or 208B, as in the first embodiment.

Under such a state, operations are performed in a pressure applying period T1, the stable period T2, an inspection period T3, and an air discharging period T4. The operation in each period is controlled in the same way as in the first embodiment.

In the pressure applying period T1, air pressure is applied to the inside of the device A or B (first device) and to the inside of the reference tank 207, as in the first embodiment. This state is maintained until the pressure applying period T1 ends. Then, the air inside is sealed.

In the next period, namely, the stable period T2, the pressure difference between the inside of the device A or B, which serves as the first device, and the inside of the reference tank 207 is measured. In the present embodiment, the pressure change B1 inside the device A or B, which serves as the first device, caused between the end of the pressure applying period T1 (which includes a step of applying pressure to the inside of the first device and a step of sealing the air inside) and a point in time when a predetermined period of time elapses from the end of the pressure applying period T1 is measured, and the pressure change B1 is stored in a RAM 306. In the present embodiment, the predetermined period of time is set to the stable period T2, and the pressure change B1 is measured at the end of the stable period T2 (see the curve X–1 in FIG. 11). The "pressure change" in the present embodiment means a change in the pressure difference between the air pressure inside the device A or B to which the air pressure was applied and the air pressure inside the reference tank 207.

The measurement processing performed in the stable period T2 in the calibration step is controlled by reference-value measurement means, configured when the CPU 304 reads the reference-value measurement program 806D. The processing to store the pressure change B1 in the RAM 306 is controlled by measured-value storage means.

Since the operations in the inspection period T3 and the air discharging period T4 are as described above, a description thereof is omitted here.

<<Inspection Step>>

The inspection step is repeated the same number of times as the number of devices to be checked for a leak.

In the inspection step, the device A or B (second device) to be checked for a leak is connected to the connection jig 208A or 208B, as in the first embodiment.

Under such a state, operations are performed in a pressure applying period T1, a stable period T2, an inspection period T3, and an air discharging period T4, as in the calibration step. Since the operations in the inspection period T3 and the air discharging period T4 are as described above, a description thereof is omitted here. The operations in the pressure applying period T1 and the stable period T2 will be described below.

In the pressure applying period T1, pressure is applied to the inside of the device A or B, which is the second device, and to the inside of the reference tank 207, and the air is sealed inside when the pressure applying period T1 is finished, in the same way as in the calibration step.

In the next period, namely, the stable period T2, the pressure difference between the inside of the device A or B, which serves as the second device, and the inside of the reference tank 207 is measured. In the present embodiment, the pressure change B1' inside the device A or B, which serves as the second device, caused between the end of the pressure applying period T1 (which includes a step of applying pressure to the inside of the second device and a step of sealing the air in the inside) and a point in time when a predetermined period of time (which equals that in the calibration step) elapses from the end of the pressure applying period T1 is measured, and the pressure change B1' is stored in the RAM 306. In the present embodiment, the predetermined period of time is set to the stable period T2, and the pressure change B1' is measured at the end of the stable period T2 (see the curve X–2 in FIG. 11).

The measurement processing performed in the stable period T2 in the inspection step is controlled by inspection-value measurement means, configured when the CPU 304 reads the inspection-value measurement program 806E. The processing to store the pressure change B1' in the RAM 306 is controlled by the measured-value storage means.

Next, waveform-ratio calculation means, configured when the CPU 304 reads the waveform-ratio calculation program 806F, reads the pressure changes B1 and B1' from the RAM 306 and calculates a waveform ratio K as B1'/B1. The calculated waveform ratio K is stored in the RAM 306.

In the pressure change B1', a pressure change component AC caused by a leak in the second device nearly equals B1'–B1 (see the line C in FIG. 11). The pressure change B1', measured at the end of the stable period T2, includes this pressure change component AC, caused by a leak in the second device. In the inspection step, whether or not the device A or B, which serves as the second device, has a leak is indefinite. When the second device has a leak, ΔC>0; and when the second device has no leak, ΔC=0. Therefore, in either case, as long as the leakage inspector works normally, the relationship B1≦B1' is satisfied. This relationship means the following for the waveform ratio K:

$$K = B1'/B1 \geq 1.$$

Then, malfunction decision means, configured when the CPU 304 reads the malfunction decision program 806G, reads the waveform ratio K from the RAM 306, and determines that the leakage inspector malfunctions when the waveform ratio K is less than 1, that is, when the pressure changes B1 and B1' have the relationship B1>B1'.

To be more specific, this waveform ratio K is used as an index to determine whether the curve X-2 (in FIG. 11), indicating the pressure-difference transition measured in each inspection step, closely resembles the curve X-1, indicating the pressure-difference transition measured in the calibration step. When K equals 1, it can be said that the curve X-2 in the inspection step closely resembles the curve X-1 in the calibration step. The more the waveform ratio K deviates from 1, the more the curve X-2 in the inspection step is separated from the curve X-1 in the calibration step, and it can be said that there is a high possibility that the leakage inspector malfunctions.

As in the example malfunction (1) of the leakage inspector, described before, for example, when leak inspection is conducted, if a port X and a port Y are not connected in a three-way solenoid valve 203, or if sealing valves 204A and 204B are closed, because air pressure is not applied to the device under inspection or to the reference tank 207, B1' nearly equals zero and the waveform ratio K nearly equals zero. Therefore, when B1 is larger than B1', the malfunction decision means can determine that "the leakage inspector malfunctioned." The decision result is displayed on a malfunction display unit 309.

As in the example malfunction (2) of the leakage inspector, described before, for example, when leak inspection is conducted, if the three-way solenoid valve 203 and the sealing valves 204A and 204B operate normally but switching valves 206A and 206B are closed, the pressure change B1' is close to zero. This is because the space inside the device A or B is separated from the region where the differential pressure gauge 205 performs measurement, by the switching valve 206A or 206B, and an adiabatic change only in the air supply lines converges within a short period of time.

Figure 12:
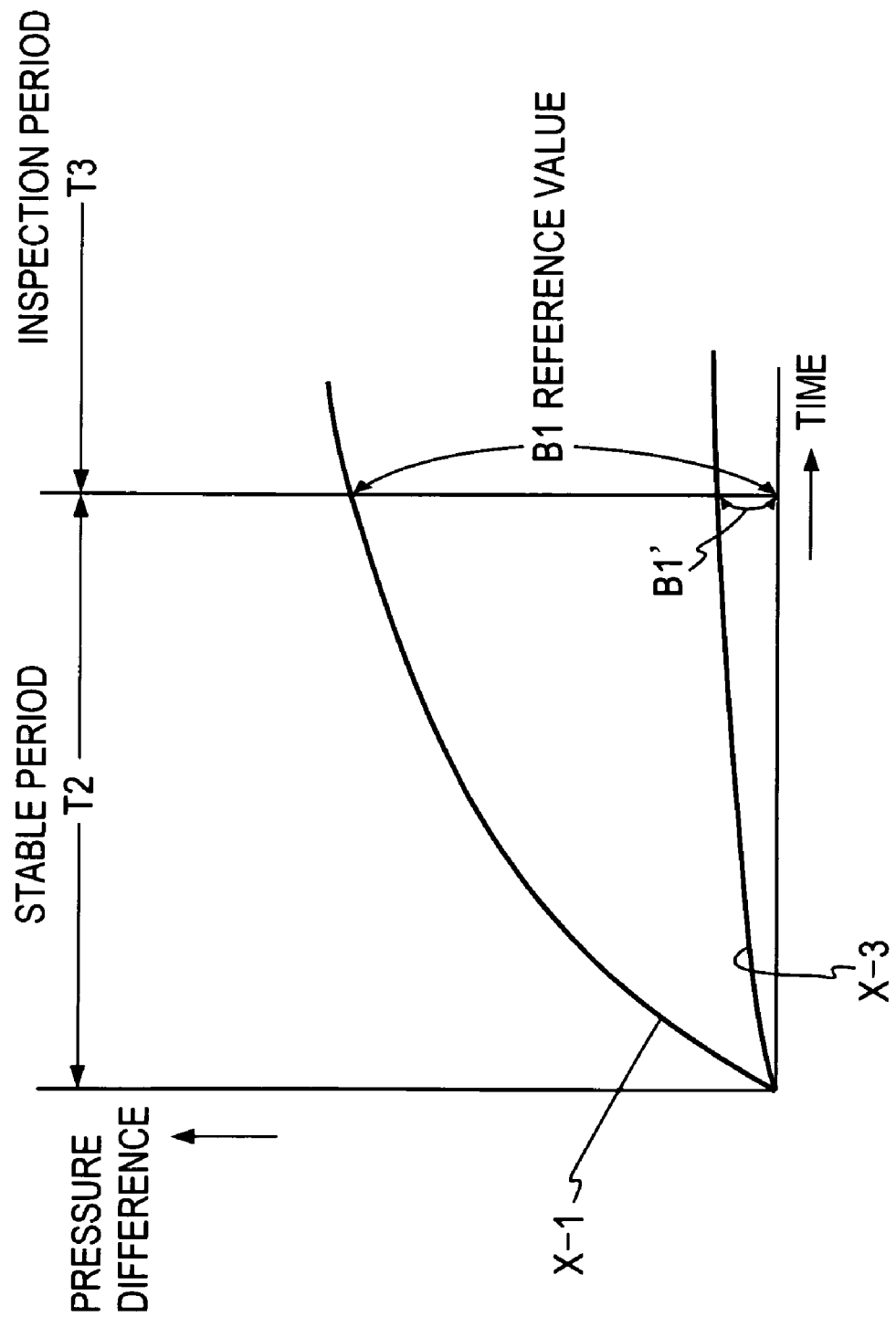
FIG. 12 is a graph showing the curve X–1, described before, and a curve X–3 indicating a temporal change in pressure difference between the inside of a device under inspection and the inside of a reference tank, measured in the state of the example malfunction (2)

FIG. 12 is a graph showing the curve X-1, described before, and a curve X-3 indicating the temporal change of the pressure difference between the inside of the device under inspection and the inside of the reference tank 207, measured in the state of the example malfunction (2). As indicated by the curve X-3 in FIG. 12, the pressure change B1' is close to zero. As a result, the waveform ratio K, calculated by the waveform ratio calculation means, nearly equals zero. When B1 is larger than B1', the malfunction decision means determines that the leakage inspector malfunctions, without paying attention to the result of the leak inspection, and displays the decision result on the malfunction display unit 309.

As in the example malfunction (3) of the leakage inspector, described before, for example, if the differential pressure gauge 205 becomes inoperable, the pressure change B1', measured in the inspection step, becomes zero. Therefore, the waveform ratio K, calculated by the waveform ratio calculation means, nearly equals zero. When B1 is larger than B1', the malfunction decision means determines that the leakage inspector malfunctions, irrespective of the leak inspection result, and displays the decision that the leakage inspector malfunctions on the malfunction display unit 309.

If the port X and the port Y are connected in the three-way solenoid valve 203 while one of the sealing valves 204A and 204B is closed, in the inspection step, it is erroneously decided that a leak exists, as described above with reference to Japanese Patent Publication No. H7-101193 (Patent Literature 2), and the decision result is displayed on the leak decision display unit 308. However, this erroneous decision, which indicates the existence of a leak, causes little actual damage because it is made although the device under inspection actually has no leak.

The present invention is not limited to the above-described embodiment. For example, in the above-described embodiment, when B1 is larger than B1', the malfunction decision means decides that the leakage inspector malfunctions. However, the relationship B1>B1' can be satisfied, for example, by a lowered detection sensitivity of the differential pressure gauge 205. In such a case, when a reduction in the detection sensitivity of the differential pressure gauge 205 is within an allowable range, it is better on some occasions not to decide that the leakage inspector malfunctions. When a 30% reduction in sensitivity compared with the normal condition is allowed, for example, the following criterion may be set for the waveform ratio K $$K = B1'/B1 > 0.7$$

to decide that a normal operation range is satisfied when K exceeds 0.7.

A threshold $\delta$ used to detect a malfunction can be set to a desired value. In that case, the malfunction decision means decides that the leakage inspector malfunctions when $B1' - B1 < \delta$.

When the leakage inspector works normally, the following condition is satisfied.

$$B1' - B1 \geq 0$$

Therefore, the smallest B1' obtained while the leakage inspector works normally is B1.

When the pressure change B1' becomes zero in inspection due to a malfunction of the leakage inspector, the following condition is satisfied.

$$B1' - B1 = -B1$$

Consequently, the range of the threshold $\delta$ which can be specified is expressed as follows.

$$0 \geq \delta > -B1$$

To generalize these relationships, the malfunction decision means decides that the leakage inspector has a malfunction when the following condition is satisfied.

$$\gamma \cdot B1 + \delta > B1' \; (\gamma: \text{constant})$$

The range where $\gamma$ can be specified is: $\gamma > 0$. There is no upper limit for $\gamma$, and $\gamma$ is appropriately specified depending on the characteristics of the measurement unit or the device under inspection. For example, to avoid an erroneous decision caused by a reduction in the detection sensitivity of the differential pressure gauge 205, $\gamma$ needs to be specified in the following range.

$$0 < \gamma \leq 1$$

In the present embodiment, the predetermined period of time is set to the stable period T2, and the pressure changes B1 and B1' are measured at the end of the stable period T2. The predetermined period of time may be shorter than the stable period T2, and the pressure changes B1 and B1' may be measured when the predetermined period of time elapses from the end of the pressure applying period T1.

Fifth Embodiment

A fifth embodiment of the present invention will be described below.

In the fifth embodiment, the fifth and sixth aspects of the present invention are applied to a gauge-pressure leakage inspector. In the following description, mainly differences from the embodiments described so far will be described.

Figure 13:
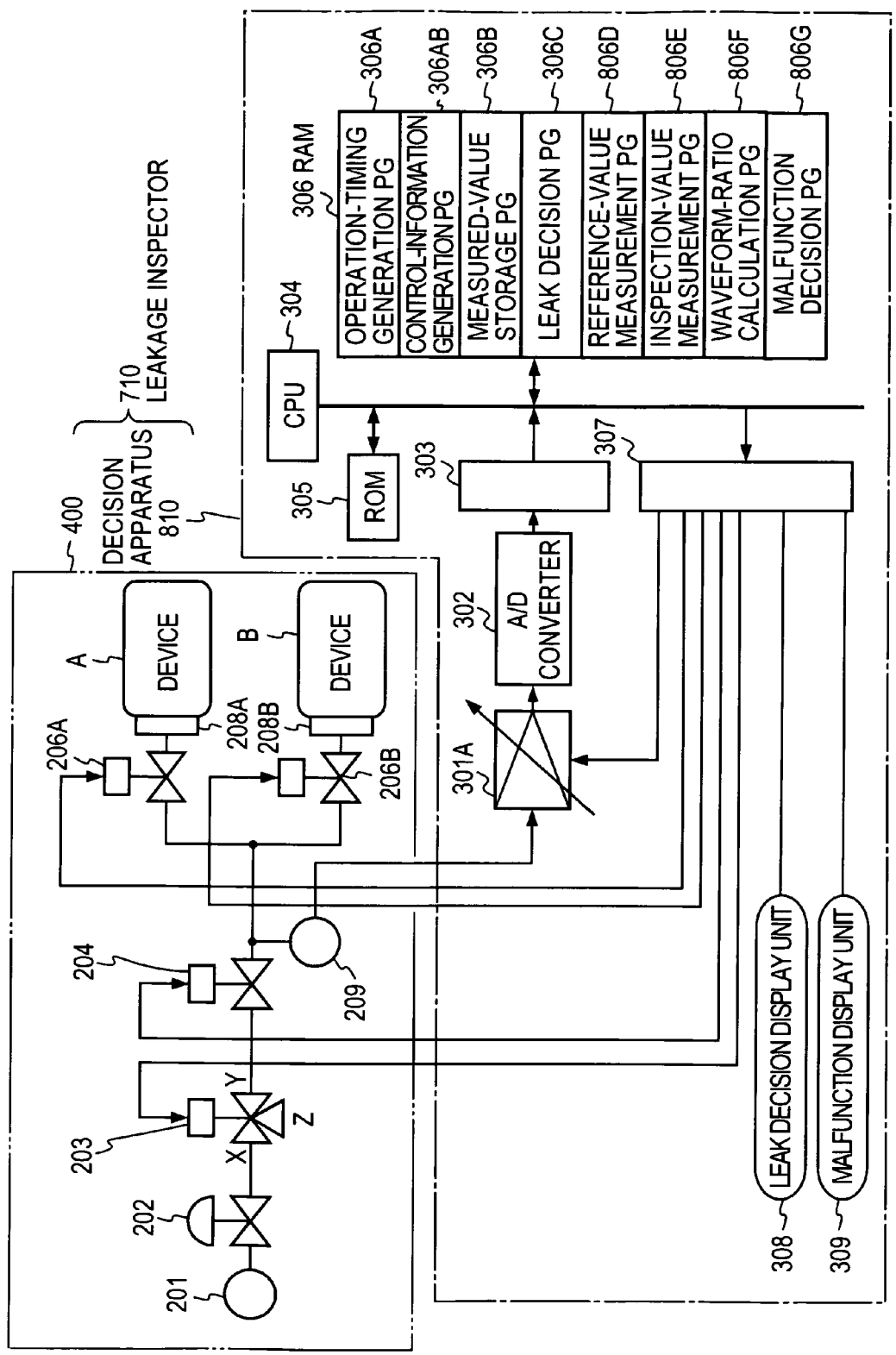
FIG. 13 is a diagram showing the structure of a leakage inspector of a fifth embodiment.

FIG. 13 is a view showing the structure of a leakage inspector 710 according to the fifth embodiment. In FIG. 13, the same symbols as those used in FIGS. 1, 3, and 8 are assigned to the same portions as those shown in FIGS. 1, 3, and 8, and a description thereof is simplified.

The leakage inspector 710 of the present embodiment comprises a pneumatic apparatus 400 and a decision apparatus 810. Since the pneumatic apparatus 400 has the same structure as the conventional one, described before, and as that in the second embodiment, a description thereof is omitted here. The decision apparatus 810 of the present embodiment differs from the decision apparatus 800 of the fourth embodiment in that the variable-gain amplifier 301A, described before, is provided instead of the variable-gain amplifier 301.

A malfunction detection method of the present embodiment is also characterized in that a waveform ratio K is obtained in a stable period T2, disposed immediately before leak inspection is performed, and a malfunction of the leakage inspector 710 and a device under inspection is decided according to the value of the waveform ratio K.

The malfunction detection method according to the present embodiment will be described below.

<<Calibration Step>>

The malfunction detection method of the present embodiment also includes a calibration step and an inspection step.

In the calibration step, a device A or B (a first device) which serves as a no-leak reference device is connected to a connection jig 208A or 208B, as in the first embodiment.

Under such a state, operations are performed in a pressure applying period T1, a stable period T2, an inspection period T3, and an air discharging period T4. The operation in each of these periods is controlled in the same as in the first embodiment.

In the pressure applying period T1, air pressure is applied to the inside of the device A or B (first device), as in the first embodiment. This state is maintained until the pressure applying period T1 ends. Then, the air is sealed inside the first device.

In the next period, namely, the stable period T2, the pressure inside the device A or B, which serves as the first device, is measured. In the present embodiment, the pressure change B1 inside the device A or B, which serves as the first device, caused between the end of the pressure applying period T1 (which includes a step of applying pressure to the inside of the first device and a step of sealing the air inside) and a point in time when a predetermined period of time elapses from the end of the pressure applying period T1 is measured, and the pressure change B1 is stored in a RAM 306. In the present embodiment, the predetermined period of time is set to the stable period T2, and the pressure change B1 is measured at the end of the stable period. The "pressure change" in the present embodiment means a change in the pressure inside the device A or B to which the air pressure was applied.

The measurement processing performed in the stable period T2 in the calibration step is controlled by reference-value measurement means. The processing to store the pressure change B1 in the RAM 306 is controlled by measured-value storage means.

Since the operations in the inspection period T3 and the air discharging period T4 are as described above, a description thereof is omitted here.

<<Inspection Step>>

The inspection step is repeated the same number of times as the number of devices to be checked for a leak.

In the inspection step, the device A or B (second device) to be checked for a leak is connected to the connection jig 208A or 208B, as in the first embodiment.

Under such a state, operations are performed in a pressure applying period T1, a stable period T2, an inspection period T3, and an air discharging period T4, as in the calibration step. Since the operations in the inspection period T3 and the air discharging period T4 are as described above, a description thereof is omitted here. The operations in the pressure applying period T1 and the stable period T2 will be described below.

In the pressure applying period T1, pressure is applied to the inside of the device A or B, which is the second device, and the air is sealed inside when the pressure applying period T1 is finished, in the same way as in the calibration step.

In the next period, namely, the stable period T2, the pressure inside the device A or B, which serves as the second device, is measured.

In the present embodiment, a pressure change B1' inside the device A or B, which serves as the second device, caused between the end of the pressure applying period T1 (which includes a step of applying pressure to the inside of the second device and a step of sealing the air inside) and a point in time when a predetermined period of time (which equals that in the calibration step) elapses from the end of the pressure applying period T1 is measured, and the pressure change B1' is stored in the RAM 306. In the present embodiment, the predetermined period of time is set to the stable period T2, and the pressure change B1' is measured at the end of the stable period T2.

The measurement processing performed in the stable period T2 in the inspection step is controlled by inspection-value measurement means. The processing to store the pressure change B1' in the RAM 306 is controlled by the measured-value storage means.

Next, waveform-ratio calculation means, configured when a CPU 304 reads a waveform-ratio calculation program 806F, reads the pressure changes B1 and B1' from the RAM 306 and calculates a waveform ratio K as B1'/B1. The calculated waveform ratio K is stored in the RAM 306.

Then, malfunction decision means reads the waveform ratio K from the RAM 306, and determines that the leakage inspector malfunctions when the waveform ratio K is smaller than 1, that is, when the pressure change B1 is larger than the pressure change B1', in the same way as in the fourth embodiment.

As in the example malfunction (1) of the leakage inspector, described before, for example, when leak inspection is conducted, if a port X and a port Y are not connected in a three-way solenoid valve 203, or if a sealing valve 204 is closed, because air pressure is not applied to the device under inspection, B1' nearly equals zero and the waveform ratio K nearly equals zero. Therefore, when the pressure change B1 is larger than the pressure change B1', the malfunction decision means can decide that "the leakage inspector malfunctioned." The decision result is shown on a malfunction display unit 309.

As in the example malfunction (2) of the leakage inspector, described before, for example, when leak inspection is conducted, if the three-way solenoid valve 203 and the sealing valve 204 operate normally but switching valves 206A and 206B are closed, the pressure change B1' is close to zero. This is because the space inside the device A or B is separated from the region where a pressure gauge 209 performs measurement, by the switching valve 206A or 206B, and an adiabatic change only in the air supply lines converges within a short period of time. In this case, the pressure change B1' is close to zero. As a result, the waveform ratio K, calculated by the waveform ratio calculation means, nearly equals zero. When B1 is larger than B1', the malfunction decision means decides that the leakage inspector malfunctions, without paying attention to the result of leak inspection, and displays the decision result on the malfunction display unit 309.

As in the example malfunction (3) of the leakage inspector, described before, for example, if the pressure gauge 209 becomes inoperable, the pressure change B1', measured in the inspection step, becomes zero. Therefore, the waveform ratio K nearly equals zero. When B1 is larger than B1', the malfunction decision means decides that the leakage inspector malfunctions, irrespective of the leak inspection result, and displays the decision that the leakage inspector malfunctions on the malfunction display unit 309.

The present invention is not limited to the above-described embodiment. For example, in the above-described embodiment, when B1 is larger than B1', the malfunction decision means decides that the leakage inspector malfunctions. However, as described in the fourth embodiment, when the relationship $\gamma \cdot B1 + \delta > B1'$ ($\gamma$: constant) is satisfied, the malfunction decision means may decide that the leakage inspector has a malfunction.

In the present embodiment, the predetermined period of time is set to the stable period T2, and the pressure changes B1 and B1' are measured at the end of the stable period T2. The predetermined period of time may be shorter than the stable period T2, and the pressure changes B1 and B1' may be measured when the predetermined period of time elapses from the end of the pressure applying period T1.

The programs described in each of the above embodiments can be recorded in computer-readable recording media. Such computer-readable recording media include, for example, magnetic recording devices, optical disks, magneto-optical recording media, and semiconductor memories. Specifically, for example, the magnetic recording devices include hard disk units, flexible disks, and magnetic tape; the optical disks include DVDs (digital versatile discs), DVD-RAMs (random access memories), CD-ROMs (compact disc read only memories), CD-Rs (recordables)/RWs (rewritables); the magneto-optical recording media include MOs (magneto-optical discs); and the semiconductor memories include EEPROMs (electronically erasable and programmable read only memories).

The programs are distributed, for example, by selling, transferring, or lending a portable recording medium that has the programs recorded thereon, such as a DVD or a CD-ROM. The programs may be distributed such that the programs are stored in a storage unit of a server computer and are transmitted from the server computer to another computer through a network.

A computer which executes the programs, for example, temporarily stores the programs recorded in a portable recording medium or the programs transmitted from the server computer in its storage unit, reads the programs stored in its storage unit when executing the processing, and executes the processing according to the read programs. In another execution form of the programs, the computer may read the programs directly from the portable recording medium and execute the processing according to the read programs. Further, every time the computer receives the programs from the server computer, the computer may sequentially execute the processing according to the received programs. The above-described processing may be executed by a so-called ASP (application service provider) service, where the server computer does not transfer the programs to the computer but the processing function is implemented only by instructing program execution and acquiring the results. The programs in the present embodiment include information that is used in processes executed by a computer and is equivalent to programs (such as data that is not a direct instruction to the computer but specifies a computer process).

In each of the above embodiments, at least a part of a portion configured when a predetermined program is executed by the computer may be implemented in hardware.

INDUSTRIAL APPLICABILITY

A method according to the present invention for detecting a fault in a leakage inspector and the leakage inspector executing the method are used, for example, in companies that manufacture various types of containers.

What is claimed is:

1. A method for detecting an operation malfunction of a leakage inspector that checks whether a device has a leak, wherein the method comprises:
   a calibration process comprising:
      applying pressure to an inside of a first device serving as a reference device;
      sealing air inside the first device;
      measuring a pressure change B1 inside the first device, caused between an end point of sealing the air inside the first device and a first point that is elapsed a predetermined period of time from the end point, and of storing the pressure change B1 in a storage section; and
      measuring a pressure change B2 inside the first device, caused between the first point and a second point that is further elapsed the predetermined period of time from the first point, and of storing the pressure change B2 in the storage section; and
   an inspection process comprising:
      applying pressure to an inside of a second device to be checked for a leak;
      sealing air inside the second device;
      measuring a pressure change B1' inside the second device, caused between an end point of sealing the air inside the second device and a third point that is elapsed the predetermined period of time from the end point, and of storing the pressure change B1' in the storage section;
   measuring a pressure change B2' inside the second device, caused between the third point and a fourth point that is further elapsed the predetermined period of time from the third point, and of storing the pressure change B2' in the storage section;
   calculating a value K as (B1'−B2')/(B1−B2); and
   signaling in response to the value K whether the operation malfunction is detected.

2. A method for detecting in an operation malfunction of a leakage inspector that checks whether a device has a leak, wherein the method comprises:
   a calibration process comprising:
      applying pressure to an inside of a first device serving as a reference device;
      sealing air inside the first device;

calculating a differential value BB1 of pressure inside the first device with respect to time, at a first point that is elapsed a first predetermined period of time from an end point of sealing the air inside the first device, and of storing the differential value BB1 in a storage section; and calculating a differential value BB2 of the pressure inside the first device with respect to time, at a second point that is elapsed a second predetermined period of time from the first point, and of storing the differential value BB2 in the storage section; and an inspection process comprising:

applying pressure to an inside of a second device to be checked for a leak;

sealing air inside the second device;

calculating a differential value BB1' of pressure inside the second device with respect to time, at a third point that is elapsed the first predetermined period of time from an end point of sealing the air inside the second device, and of storing the differential value BB1' in the storage section; and calculating a differential value BB2' of the pressure inside the second device with respect to time, at a fourth point that is further elapsed the second predetermined period of time from the third point, and of storing the differential value BB2' in the storage section;

calculating a value K as (BB1'−BB2')/(BB1−BB2); and signaling in response to the value K whether the operation malfunction is detected.

3. A leakage inspector for checking whether a device has a leak, the leakage inspector comprising:

a pneumatic source connected to the device through an air supply line, the pneumatic source adapted to apply pressure to an inside of the device;

a valve disposed in the air supply line;

a measurement unit adapted to measure the pressure inside the device;

a processor; and a storage section adapted to store a measured value obtained by the measurement unit;

wherein the processor is adapted to control execution of:

opening the valve and applying pressure to an inside of a first device serving as a reference device;

closing the valve and sealing air inside the first device;

making the measurement unit measure a pressure change B1 inside the first device occurring between an end point of sealing the air inside the first device and a first point that is elapsed a predetermined period of time from the end point, and store the pressure change B1 in the storage section; and making the measurement unit measure a pressure change B2 inside the first device occurring between the first point and a second point that is further elapsed the predetermined period of time from the first point, and store the pressure change B2 in the storage section;

opening the valve and applying pressure to an inside of a second device to be checked for a leak;

closing the valve and sealing air inside the second device;

making the measurement unit measure a pressure change B1' inside the second device occurring between an end point of sealing the air inside the second device and a third point that is elapsed the predetermined period of time from the end point, and store the pressure change BP in the storage section; and making the measurement unit measure a pressure change B2' inside the second device occurring between the third point and a fourth point that is further elapsed the predetermined period of time from the third point, and store the pressure change B2' in the storage section;

calculating a value K as (B1'−B2')/(B1−B2); and signaling in response to the value K whether an operation malfunction in the leakage inspector is detected.

4. A leakage inspector according to claim 3, wherein
the measurement unit is a differential pressure gauge; and
the pressure changes B1, B2, B1', and B2' are changes in pressure difference between the inside of the first device or the second device and an inside of a reference tank.

5. A leakage inspector according to claim 3, wherein
the measurement unit is a pressure gauge; and
the pressure changes B1, B2, B1', and B2' are changes in pressure inside the first device or the second device, with respect to atmospheric pressure.

6. A leakage inspector according to claim 3, wherein
the second device is a cast; and
the processor is adapted to decide that the second device has a blowhole on its inner wall when the waveform ratio K equals 1 plus a predetermined value or more.

7. A leakage inspector according to claim 3, wherein
the processor is adapted to decide whether or not the second device has a leak according to the changes in air pressure inside the second device, and to decide that one of the air supply line, the valve, and the measurement unit has a malfunction when it is decided that the waveform ratio K equals zero plus a predetermined value or less.

8. A leakage inspector for checking whether a device has a leak, the leakage inspector comprising:

a pneumatic source connected to the device through an air supply line, the pneumatic source adapted to apply pressure to an inside of the device;

a valve disposed in the air supply line;

a measurement unit adapted to measure the pressure inside the device;

a processor; and a storage section adapted to store a measured value obtained by the measurement unit;

wherein the processor is adapted to control execution of:

opening the valve and applying pressure to an inside of a first device serving as a reference device;

closing the valve and sealing air inside the first device;

calculating a differential value BB1 of pressure inside the first device with respect to time, at a first point that is elapsed a first predetermined period of time from an end point of sealing the air inside the first device, and storing the differential value BB1 in the storage section;

calculating a differential value BB2 of the pressure inside the first device with respect to time, at a second point that is elapsed a second predetermined period of time from the first point, and storing the differential value BB2 in the storage section;

opening the valve and applying pressure to an inside of a second device to be checked for a leak;

closing the valve and sealing air inside the second device;

calculating a differential value BB1' of pressure inside the second device with respect to time, at a third point that is elapsed the first predetermined period of time from an end point of sealing the air inside the second device, and storing the differential value BB1' in the storage section; and calculating a differential value BB2' of the pressure inside the second device with respect to time, at a fourth point that is further elapsed the second predetermined period of time from the third point, and storing the differential value BB2' in the storage section;

calculating a value K as (BB1'−BB2')/(BB1−BB2); and signaling in response to the value K whether an operation malfunction of the leakage inspector is detected.

9. A leakage inspector according to claim 8, wherein the measurement unit is a differential pressure gauge; and the differential values BB1, BB2, BB1', and BB2' are differential values of pressure differences between the inside of the first device or the second device and an inside of a reference tank.

10. A leakage inspector according to claim 8, wherein the measurement unit is a pressure gauge; and the differential values BB1, BB2, BB1', and BB2' are differential values of pressure inside the first device or the second device, with respect to atmospheric pressure.

11. A leakage inspector according to claim 8, wherein the second device is a cast; and the processor is adapted to decide that the second device has a blowhole on its inner wall when the waveform ratio K equals 1 plus a predetermined value or more.

12. A leakage inspector according to claim 8, wherein the processor is adapted to decide whether or not the second device has a leak according to the changes in air pressure inside the second device, and to decide that one of the air supply line, the valve, and the measurement unit has a malfunction when it is decided that the waveform ratio K equals zero plus a predetermined value or less.

13. A method for detecting an operation malfunction of a leakage inspector that checks whether a device has a leak, wherein the method comprises:

a calibration process comprising:

applying pressure to an inside of a first device serving as a reference device;

sealing air inside the first device; and measuring a pressure change B1 inside the first device, caused between an end point of sealing the air inside the first device and a point that is elapsed a predetermined period of time from the end point, and of storing the pressure change B1 in a storage section; and an inspection process comprising:

applying pressure to an inside of a second device to be checked for a leak;

sealing air inside the second device;

measuring a pressure change B1' inside the second device, caused between an end point of sealing the air inside the second device and a point that is further elapsed the predetermined period of time from the end point, and of storing the pressure change B1' in the storage section; and signaling that the operation malfunction is detected when the pressure changes B1 and B1' have a relationship $\gamma \cdot B1 + \delta > B1'$, where $\gamma$ and $\delta$ are constants.

14. A leakage inspector for checking whether a device has a leak, the leakage inspector comprising:

a pneumatic source connected to the device through an air supply line, the pneumatic source adapted to apply pressure to an inside of the device;

a valve disposed in the air supply line;

a measurement unit adapted to measure the pressure inside the device;

a processor; and a storage section adapted to store a measured value obtained by the measurement unit; wherein the processor is adapted to control execution of:

opening the valve and applying pressure to an inside of a first device serving as a reference device;

closing the valve and sealing air inside the first device;

making the measurement unit measure a pressure change B1 inside the first device, caused between an end point of sealing the air inside the first device and a point that is elapsed a predetermined period of time from the end point, and store the pressure change B1 in the storage section;

opening the valve and applying pressure to an inside of a second device to be checked for a leak;

closing the valve and sealing air inside the second device; and making the measurement unit measure a pressure change B1' inside the second device, caused between an end point of sealing the air inside the second device and a point that is elapsed the predetermined period of time from the end point, and store the pressure change B1' in the storage section; and signaling that an operation malfunction of the leakage inspector is detected when the pressure changes B1 and B1' have a relationship $\gamma \cdot B1 + \delta > B1'$, where $\gamma$ and $\delta$ are constants.

15. A leakage inspector according to claim 14, wherein the measurement unit is a differential pressure gauge; and the pressure changes B1 and B1' are changes in pressure difference between the inside of the first device or the second device and an inside of a reference tank.

16. A leakage inspector according to claim 14, wherein the measurement unit is a pressure gauge; and the pressure changes B1 and B1' are changes in pressure inside the first device or the second device, with respect to atmospheric pressure.

* * * * *